US011100565B2

(12) United States Patent
Brannigan et al.

(10) Patent No.: US 11,100,565 B2
(45) Date of Patent: Aug. 24, 2021

(54) SYSTEMS AND METHODS FOR ALLOCATING AND DISTRIBUTING INVENTORY

(71) Applicant: MERCATO, INC., New York, NY (US)

(72) Inventors: Robert Brannigan, New York, NY (US); David Bateman, Batavia, NY (US); Michael Mason, Spencerville, MD (US); Matthew Alarie, San Diego, CA (US)

(73) Assignee: Mercato, Inc., New York, NY (US)

( * ) Notice: Subject to any disclaimer, the term of this patent is extended or adjusted under 35 U.S.C. 154(b) by 215 days.

(21) Appl. No.: 15/987,861

(22) Filed: May 23, 2018

(65) Prior Publication Data

US 2018/0342007 A1    Nov. 29, 2018

Related U.S. Application Data

(60) Provisional application No. 62/510,092, filed on May 23, 2017.

(51) Int. Cl.
*G06Q 30/00* (2012.01)
*G06Q 30/06* (2012.01)
*G06Q 10/08* (2012.01)

(52) U.S. Cl.
CPC ....... *G06Q 30/0635* (2013.01); *G06Q 10/087* (2013.01); *G06Q 30/0643* (2013.01)

(58) Field of Classification Search
None
See application file for complete search history.

(56) References Cited

U.S. PATENT DOCUMENTS 9,639,908 B1 * 5/2017 Reiss ................. G06Q 50/12
2008/0262865 A1 * 10/2008 Cotton ............... G06Q 30/06
705/1.1

(Continued)

OTHER PUBLICATIONS

"Lavy, Lior, 'Bridging the Gap How Technology Helps Food Artisans Connect with Consumers' Mar. 9, 2016, IEEE Technology and Society Magazine, ieee.com" (Year: 2016).*

(Continued)

*Primary Examiner* — William J Allen
*Assistant Examiner* — Maria S. P. Heath
(74) *Attorney, Agent, or Firm* — James Scott Nolan

(57) ABSTRACT

Presented herein is an online marketplace for the selling and delivering of items for sale. The online marketplace includes devices and systems as well as their methods of use for the online purchase of goods as well as for the efficient and expedient delivery of the goods purchased. In particular embodiments, the system may include a cloud based database that stores images of the items for purchase, and may further include an associated computing device that is configured for receiving data corresponding with the one or more physical items represented by the images of the goods for sale that are stored in the database. The computing device is further configured for displaying the data corresponding with the one or more physical items for sale, e.g., to a client via a web portal; obtaining order data for an online order for the one or more physical items for sale; assessing geolocation data for the online order for delivery within a defined delivery area, and notifies a client that the online order should be delivered as well as indicates the most efficient manner in which to make the delivery.

14 Claims, 8 Drawing Sheets

(56) References Cited

U.S. PATENT DOCUMENTS

| | | | |
|---|---|---|---|
| 2013/0151381 A1* | 6/2013 | Klein | G06Q 30/0641 |
| | | | 705/27.1 |
| 2013/0346237 A1* | 12/2013 | Rademaker | G06Q 10/0836 |
| | | | 705/26.8 |
| 2014/0089138 A1* | 3/2014 | Borders | G06Q 10/0631 |
| | | | 705/26.8 |
| 2015/0262121 A1* | 9/2015 | Riel-Dalpe | G06Q 10/08 |
| | | | 705/15 |
| 2016/0232460 A1 | 8/2016 | Gibson et al. | |
| 2016/0328666 A1 | 11/2016 | Ghini | |
| 2017/0011449 A1* | 1/2017 | Mueller | G06Q 30/0635 |

OTHER PUBLICATIONS

International Search Report and Written Opinion from PCTUS1834231 dated Oct. 17, 2018.

* cited by examiner

SYSTEMS AND METHODS FOR ALLOCATING AND DISTRIBUTING INVENTORY

CROSS REFERENCE TO RELATED APPLICATION

The present application claims the benefit of U.S. Provisional Patent Application No. 62/510,092, filed May 23, 2017 entitled "SYSTEMS AND METHODS FOR ALLOCATING AND DISTRIBUTING INVENTORY", the disclosure of which is incorporated herein by reference in its entirety.

BACKGROUND

The following description of the background of the invention is provided simply as an aid in understanding the invention and is not admitted to describe or constitute prior art to the invention.

The craft/small-batch goods movement is a fast-growing business trend with a focus on independently-owned and operated businesses producing smaller quantities of hand-crafted goods, such as beverages, food, farm produce/meats, baked goods, clothing, etc., with a focus on higher-quality goods than what may be produced in much larger quantities by the bigger industrial-scale producers. The rapid increase in craft and artisanal goods businesses reflects a clear demand in the marketplace by consumers who desire higher-quality, better cultivated products, in a wider variety of selections than may be available from the large scale, nation-wide vendors, and are willing to pay a premium for these hand-craftsman products. In addition, the demand for small-batch products may also reflect a desire by consumer to re-invest their money with local businesses.

Despite the increased demand for craft goods across many industries, small batch producers still face several problems in keeping the business profitable and growing, and thus experience challenges in being able to compete in the market place. For example, small business may have a storefront where their product is sold; however, only selling their craft product via the physical storefront relies entirely on foot traffic for sales. In many cases, the production facility and storefront are part of the same space, making it hard to expand, difficult to showcase items, and forcing customers to physically come to that storefront in order to make their purchases. To better compete in the market place, these craft good producers need to increase the volume of products sold over time and also increase the geographic reach to potential customers. However, due to the localized nature of the small-batch business, it is extremely difficult for them to distribute their products outside of their production facility and local environment. Hence, the ability to deliver and/or distribute their artisanal products presents several problems for the craft business owner.

Small businesses have limited resources to divert towards distribution or delivery of their products. Additional resources are needed to plan for and implement a far-ranging distribution or delivery system, the logistics of which differ drastically from their local market, and may differ greatly depending on the particular craft products being made and brought to market. Particularly, the manpower and resources of small businesses are often focused on the production of the products themselves, and cannot be allocated to the additional tasks of building and developing a delivery system, and/or then matching the production rate to accommodate the increased demand of having a delivery system. In addition, their monetary resources may be highly constrained due to the size of the business, saturation of the local market, and limited ability to grow, making it difficult to outsource delivery so as to cultivate and develop a larger following for their goods. Along with the manpower and monetary resource constraints, the time available to the owner and employees of the artisanal business for inventory tracking, delivery, and/or distribution of products may also be limited. The amount of time required to create and maintain a system that can track and allocate inventory as well as handle the logistics of delivering their products often far outstrips what little non-production time may be available to growing the small-batch business outside of its local market.

In various instances, craft producers may also lack the technical know-how to set up and run complex inventory management systems efficiently, the difficulty of which is increased exponentially when run alongside a delivery/distribution system. Many craft business owners are running the business as a second or parallel career, and simply lack the experience and knowledge of the problems and pitfalls that such businesses typically face when growing their customer base. This lack of expertise may result in the craft producer squandering valuable time and money in trying to set up such systems on their own, and jeopardizing the basic production capabilities of the business, while increasing the risk of failure due to a poorly executed expansion initiative.

Accordingly, the challenges faced by craft-product businesses in expanding their size and geographic reach, especially when competing against much larger corporate entities, result in several negative consequences. For example, the ability of small craft-product business to expand is severely hampered, as they are competing against large corporate businesses with superior money, manpower, national advertising, and brand recognition that allow them better access and bargaining power for producing, distributing, and/or offering goods for sale in both large-scale and local markets. This increases a market tendency towards integration, with only a few large businesses dominating the market, and squeezing out the ability of small businesses to compete. This domination by only a few large businesses greatly affects the local community, which effects may be felt in a lack of choice in products, an inability to access higher-quality goods when desired, as well as a lack of freshness of the products produced. For example, large grocery stores may provide access to only a limited number of large farm suppliers in order to reduce costs in favor of increased volume, resulting in lower quality meat and produce that takes longer to get to the grocery store and is less fresh. Additionally, the dominance of larger corporate businesses results in a focus on cutting costs, and not on developing newer, cutting edge technologies, which would be useful for enhancing competition in the market place.

Hence, small-batch businesses also face a number of technological challenges that need to be overcome in order to successfully compete with the large corporate producers. For example, small-batch businesses do not typically have the resources to invest in technology, such as to efficiently grow the business, track inventory, and/or provide feedback as to whether production needs to be increased or quality enhanced. Small-batch businesses also often lack the resources for quickly and efficiently estimating when delivery or distribution of products will occur. A useful resource, as provided herein, would be a system, mechanism, and a manner of its use that would allow small batch businesses to develop and reach a larger consumer base than is presently possible in today's market, which would, in turn, allow them to better compete in the marketplace while increasing the consumer's opportunity to purchase a wider variety of goods from a larger selection of producers and/or manufacturers.

The goal of the technologies described herein is to solve these and other problems faced by craft products businesses, allowing such businesses and their products to reach a wider consumer base and thereby to compete more effectively with large corporate producers, manufacturers, distributors, and sellers.

SUMMARY

Hence, in various instances, implementations of various aspects of the disclosure may include, but are not limited to: apparatuses, systems, and methods including one or more features as described in detail herein, as well as articles that comprise a tangibly embodied machine-readable medium operable to cause one or more machines (e.g., computers, etc.) to result in operations described herein. Similarly, computer systems are also described that may include one or more processors and/or one or more memories coupled to the one or more processors. Accordingly, computer implemented methods consistent with one or more implementations of the current subject matter can be implemented by one or more data processors residing in a single computing system or multiple computing systems containing multiple computers, such as in a computing or supercomputing bank.

Such multiple computing systems can be connected and can exchange data and/or commands or other instructions or the like via one or more connections, including but not limited to a connection over a network (e.g. the Internet, a wireless wide area network, a local area network, a wide area network, a wired network, a physical electrical interconnect, or the like), via a direct connection between one or more of the multiple computing systems, etc. A memory, which can include a computer-readable storage medium, may include, encode, store, or the like one or more programs that cause one or more processors to perform one or more of the operations associated with one or more of the algorithms described herein.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

Accordingly, in one aspect, presented herein are systems, apparatuses, and methods for implementing online marketplace protocols, such as for performing one or more functions for generating an online inventory, allowing access and ordering for online sale, allocating inventory for in-store vs. online sale, packaging and/or delivering inventory, via one or more optimized algorithms and/or on one or more optimized integrated circuits, such as on one or more hardware processing platforms. Hence, in one instance, methods are provided for implementing logic or one or more algorithms for performing one or more steps for identifying, allocating, and tracking the packaging and/or delivery of inventory items in a inventory allocation protocol, such as where one or more of the steps are to be implemented within the framework of computer readable media or implemented via one or more of firmware and/or hardware.

In one aspect, the disclosure provides an online marketplace system for selling and delivering items. The online marketplace includes a database stored on a non-transitory computer readable medium of the at least one computing device, such as a server or a bank of servers. The database stores data corresponding with one or more physical items for sale, such as prices, amounts, identifying numbers, and/or image files. The database is in communication with a computing device that is configured to execute logic in machine-executable instructions to receive data corresponding with one or more physical items for sale (e.g. inventory data) and store the data in the database. The computer device may display the data to a client via a web portal. The system may obtain order data from an online order placed by a user for one or more corresponding physical items. Logic in the system may then compare the order data for the online order with the data in the database and ensure that the corresponding physical item has not been allocated for another order. The system may then identify the order data as ready for packaging and notify a client (such as a tablet or laptop at the fulfillment center or store) that is networked to the computing device that the online order is ready to be packaged.

The system may also assess geolocation data associated with the order data to determine whether the order is within a defined delivery area and assigns an identifier to the online order for delivery within the delivery area. Logic in the system may then notify the networked client that the online order should be delivered with other online orders also identified for delivery within the defined delivery area. The system may receive a notification from the client that the physical items in the online order were picked up for delivery. The system may also be in communication with a delivery client (such as a smartphone or tablet), and be able to receive a notification that the physical items associated with the online order were delivered.

In another aspect, the disclosure herein provides a method of offering goods for sale via an online marketplace. The method includes the step of accessing a database that is embodied on a non-transitory computer readable medium on a computing device (such as server or bank of servers). The database is configured for storing data on physical items for purchase, such as items in a shop's inventory. Item data regarding each of the physical items may be uploaded via a second computing device that communicates with the first computing device via a network. One or more images from the database may be selected and associated with item data for a particular type of item that has been uploaded to the database. Each of the one or more items and at least some of the associated item data may then be displayed in a streaming loop via a web portal, when the web portal is accessed by a client (such as a smartphone, tablet, or laptop).

In another aspect, the instant disclosure provides a method of delivering goods ordered by a consumer via an online marketplace. The method includes the step of receiving digital order data for a first online order of goods in a first computing device (such as a server). The digital order data may be stored in a database on a non-transitory computer readable medium in data communication with the first computing device. A second computing device (such as a tablet or laptop at a fulfillment center) is notified that the digital order data for the first online order has been received by the first computing device. The first computing device allows the second computing device to access to the digital order data for the first online order. The second computing device may then notify the first computing device that physical items corresponding with the digital order data are packaged.

The method further includes a step of assessing geolocation data associated with the digital order data and grouping the digital order data with digital order data for a second online order of goods. Both the first and second online orders are within a defined area for delivery. The second computing device may then be notified that the physical items corresponding with the first digital order should be grouped with the physical items corresponding with the second digital order for delivery. The method further includes a step of receiving a notification that the physical items associated with the first online order were picked up for delivery, as well as a step of receiving a notification that the physical items associated with the first online order were delivered.

The summary of the disclosure described above is non-limiting and other features and advantages of the disclosed apparatus and methods will be apparent from the following detailed description of the disclosure, and from the claims.

DETAILED DESCRIPTION OF THE DISCLOSURE

The present disclosure is directed to systems and methods for allocating and distributing inventory, such as perishable products.

As used herein, unless otherwise stated, the singular forms "a," "an," and "the" include plural reference.

Craft and/or artisanal product businesses may include small, locally owned and operated producers, manufacturers, and suppliers that produce and/or supply unprocessed, handmade goods that are of a higher quality than typically available through the mass-production manufacturing and nationwide distribution networks that are dominating the today's marketplace. Such craft and/or artisanal producers and/or manufacturers may include small farms that raise organic produce and free-range and/or grass-fed livestock, without genetic and/or chemical modifications. In some instances, such small farms may raise produce and/or livestock of a particular species or type that is known for being particularly desirable by consumers in the local community due to preferred flavor or quality. Suppliers may also manufacture perishable foods such as jams and jellies, creams, cheeses, and other dairy products, that are made from non-genetically genetically modified or enhanced organisms, using all-natural product precursors, but in small quantities. While suppliers such as small farms can sell their inventory to grocery stores in a defined geographic region, the limited resources, manpower, and technical expertise needed to compete in a wider market may limit the geographic reach of their delivery and distribution. In addition, their resources, manpower, and expertise may be limited with respect to selling directly to consumers. This can deprive consumers of access to their natural, high-quality, organic goods, and at the very least force consumers to seek them out in a limited number of physical stores and vendors.

In addition to suppliers, smaller local vendors and shops may purchase and resell craft or small-batch products from artisanal suppliers on a limited basis. In some instances, such local vendors may purchase high-quality raw materials, such as from small batch producers, e.g., farmers, so as to produce their own craft/small-batch products that they may then offer for sale. Such shops and vendors employ a limited number of skilled craftspeople with a focus on making and/or selling high-quality goods; because of the time and/or skill it takes to produce and/or manufacture the goods are produced in small quantities. However, such craft/small-batch shops and vendors have a limited ability to provide their goods to consumers away from the shop's location, even if they could ramp up production without sacrificing quality. Exemplary craft/small-batch shops and vendors may include, without limitation, bakeries, delicatessens, butcher shops, fish markets, grocery stores, family owned and operated restaurants, and the like.

Figure 1:
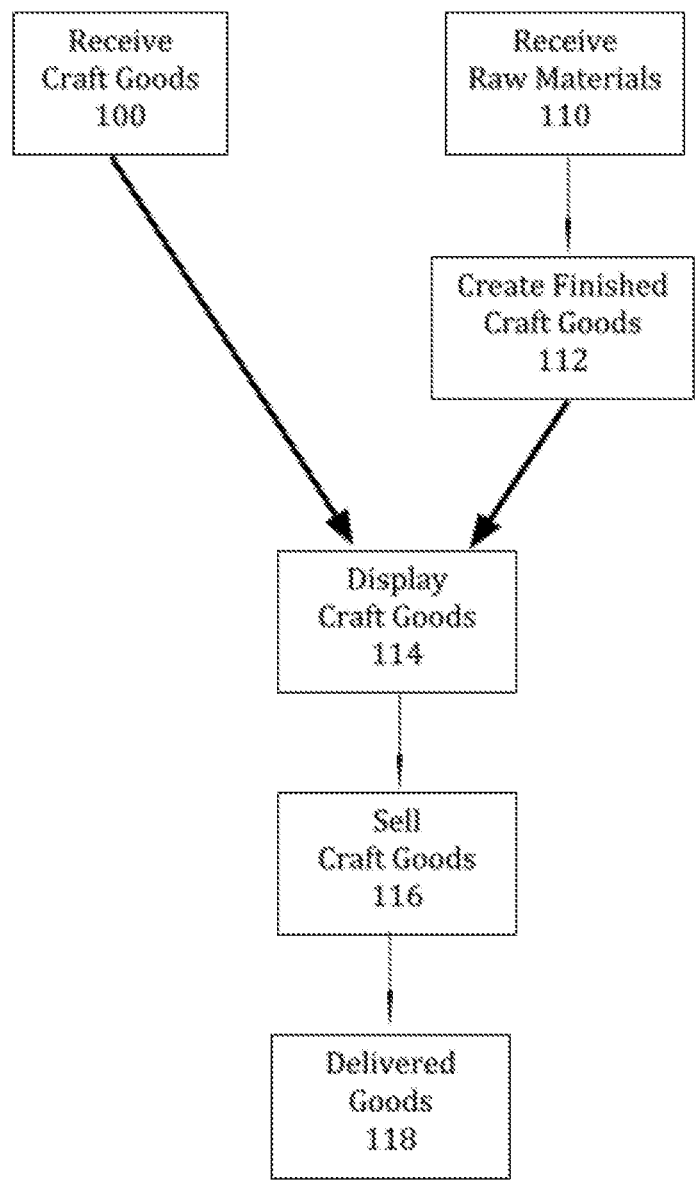
FIG. 1 shows a flowchart of goods being produced and sold by a craft goods store.

FIG. 1 is a flowchart of an exemplary process of goods moving through a craft or small-batch shop, such as a brick and mortar storefront. For instance, craft and small-batch shops and vendors may receive inventory 100, if their focus is on selling produced or otherwise finished goods from others, such as a grocery store that receives produce and dairy products from one or more farms. In other instances, craft and small-batch shops may receive raw materials 110 from a supplier and create their own finished goods 112, such as a bakery, brewery, or delicatessen. These shops and vendors may then display all or a portion of their inventory of goods 114 in their shop, and then sell the craft goods 116 to local customers that visit the shop's location. However, such a brick and mortar based offering severely limits the ability of the store owner to reach a greater number of customers, thereby limiting the ability to get the produced goods into the hands of the consumer, thereby limiting the store owner's ability to increase sales, which would allow the owner to expand the business so as to better reach a greater number of customers. Hence, the limited ability for small batch store owners to get their high-quality goods in the hands of a greater amount of consumers is stifling the ability of such artisan craftsmen to efficiently compete in the market place. A delivery system, mechanism, and its method of use, as herein provided, solves this problem.

Craft and small-batch shops do not typically include a mechanism for delivering their goods to customers, and this may at least in part be due to the difficulty inherent to setting up and managing an efficient delivery scheme on top of their craft production focus. Hence, if a shop wants to deliver the high quality products they produce or otherwise manufacture, so as to increase sales and reach a larger potential customer base, then they must either create a delivery system themselves, or use an outside contractor to move the products, such as a larger corporately controlled delivery service. However, because of the immensities of such organizations, their focus on cost-cutting as a means to increase shareholder profits, as well as lack of sufficient oversight, such delivery systems are less than ideal when it comes to the delivery of fragile, small batch goods, that need to be carefully delivered in a timely fashion.

Consequently, even if the small-batch shops use an outside contractor for delivery, there is no assurance that the goods to be delivered will be delivered to the right address, in the right amount of time, and in a manner coincident with the care and quality with which the good was produced in the first instance. Additionally, because of the corporate nature of such delivery services, the cost charged for such inferior deliveries is often exorbitant, making their use economically non-viable. Further, the use of outside delivery services is less than ideal in that there is typically no integration with any inventory tracking and/or payment systems that may be used by the small-concern business, if there are any at all. This makes the offering, managing, acquiring, selling, and/or tracking of sold inventory to customers outside of the local brick and mortar community difficult if not impossible to implement.

For instance, many nationwide producers and/or sellers of goods have vast resources they can use to develop on online, e.g., cloud-based, sales organization. Particularly, retailers often have a dedicated website where a consumer may access a series of displays offering goods for sale. However, these goods are usually mass produced, non-hand made, and stored in bulk in a variety of large distribution facilities. Because of their mass production and fungible nature, these goods are ideal for shipment by the large corporate-run delivery services, if something is lost or damaged in the delivery process it is easily replaced. Such is not the case for small batch manufacturers and retailers. Since the goods are produced in small quantities, and are often handmade or crafted, their loss is not easily replaced nor its value recouped, such as through mass production. To further complicate matters, in order to receive, track, manage, and deliver products ordered via a webpage, a small-batch shop would need to integrate and automate several functions with the shop's currently existing payment systems, as well as any inventory or production systems, which in turn would require a level of specialization and technical expertise that may be beyond the scope and/or reach of many small batch craftspeople. Without a well-integrated system to allow ordering and delivery, craft vendors must expend time, money and effort to link different systems together, wasting valuable resources required to produce the goods and run the business.

The systems, mechanisms, and methods described herein solve these problems by allowing a small-batch producer, shop and/or vendor to easily and quickly create an ordering web-based interface that may be configured so as to offer their goods for sale and/or delivery to a larger consumer base than would otherwise be possible by simply tending to their known customer base and/or brick and mortar retail shop. For instance, in one aspect, an online marketplace is provided, which market place will allow local producers, sellers, distributors, and/or buyers to offer their goods for sale and/or for the purchase of such goods in a simple to use, intuitive, and easy to manage interface. Additionally, in another aspect, an efficient, timely, and safe delivery system is provided which will allow for the quick and economical delivery of the goods to the supplier, distributor, or customer pursuant to such purchases.

Accordingly, in one instance, a web-portal is provided. The web-portal is configured as an online marketplace that is easy to access and navigate so as to swiftly list and/or display goods for sale as well as to easily select goods for purchase and/or delivery. Hence, in certain instances, a system is provided. The system includes a cloud-based processing platform and database for the listing of goods for sale, and further includes a display by which the goods listed for sale may be displayed. The system additionally includes an interface, such as an input interface, for connecting with the cloud-based processing platform and/or associated database so as to upload images of goods for sale, indicate a given uploaded good is for sale, and for selecting a good to be purchased. In various instances, the system may also include a local processing unit and/or data store, such as may be used for uploading the images of goods to be offered for sale, and/or for selecting goods to be purchased, and/or delivered. Accordingly, the system is further configured for arranging the selected and purchased good(s) to be delivered to the purchaser, such as in a timely and efficient manner.

Figure 2:
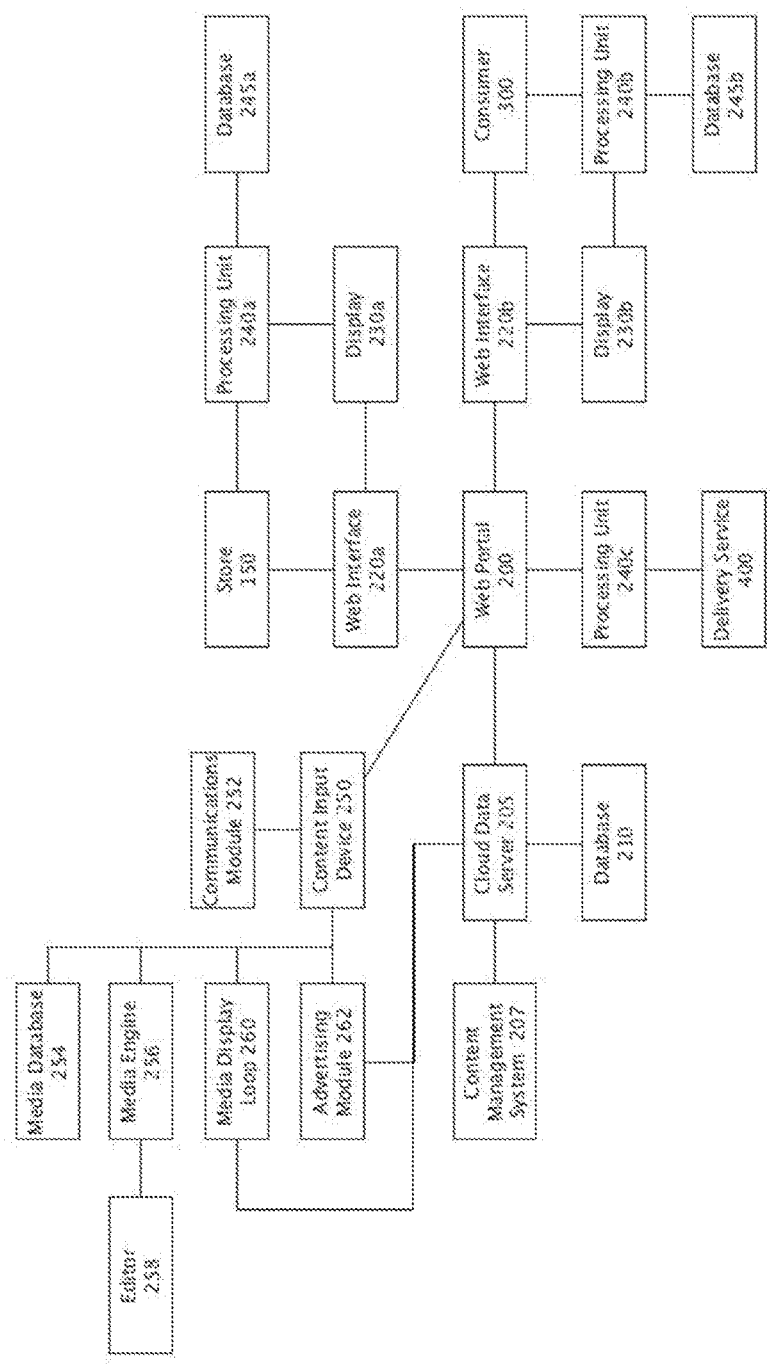
FIG. 2 shows a schematic diagram of a system for online sales of craft goods.

Hence, in a first instance, as can be seen with respect to FIG. 2, a web-portal 200 is provided that is communicably or otherwise operably connected to a cloud-based data server 205 that is in turn communicably connected to a database 210, such as where the database 210 is configured for storing a representation of goods 116 to be sold. Web-portal 200 may include an interface 220a that allows a store 150, such as a small batch producer 151, manufacturer 152, or retailer 155 (see FIG. 3) to upload an image of goods, e.g., raw materials 110 or finished goods 112, such as from an inventory of goods 100, that are to be offered for sale 114. For instance, a producer 151, manufacturer 152, or retailer 155 may acquire one or more images of one or more goods 114 from an inventory of goods 100, which images may be stored on a local database 245a and/or uploaded, e.g., via a local processing unit 240a, to the web portal 200, such as via the web interface 220a. Likewise, a consumer 300 of goods may access the web portal 220b so as to view the goods 114 uploaded by one or more of the producers and/or retailers 150, such as via display 230a. For instance, the consumer 300 may engage a local processing unit 240b connected to a display 230b, so as to access the web interface 220b, and thereby connect with the web portal 200, so as to view, review, compare, and ultimately purchase the goods 116.

Accordingly, in such a manner as this, the web-portal 200 allows for various producers 150, such as small batch, artisan producers 151, e.g., farmers, ranchers, gardeners, fisherman, or manufacturers 152, and the like, such as serving a local community, to connect with retailers 155, such as small batch, artisan retailers, e.g., local markets, butchers, flower shops, and the like, within the local community or broader. Web-portal 200 allows producers 150 to finish and list their inventory for sale 114 and/or to purchase the listed inventory 100, such as raw materials 110 that are to be used by the retailer to produce their finished goods for sale 112. Likewise, the web-portal 200 allows for such small batch retailers 155 to connect with consumers 300, such as outside their local brick and mortar establishment, so as to offer their goods for sale 114 to a larger customer base than would otherwise be possible. Additionally, in various instances, the web-portal 200 may be accessed or otherwise configured to push data, such as order data, to a processing unit 240c of a delivery service and/or mechanism 400 so as to effectuate the delivery of purchased good 116 to the purchasing entity, e.g., retailer 155 or consumer 300, thereby making them delivered goods 118.

In view of the above, in one aspect of the disclosure, a cloud-based marketplace system 2 is provided. (See FIG. 6.) The cloud-based marketplace 2 may be configured as a computing platform, such as a computer chip, e.g., microprocessor, integrated circuit, such as a field gated programmable array (FPGA) or application specific integrated circuit (ASIC), computer system, and/or server system 205 that is configured for carrying out the functions necessary for operating the online market system 2. Exemplary functions may include allowing producers 151, manufacturers 152, and/or retailers 155 to list their goods, e.g., raw materials 110 or finished goods 112, for sale, e.g., via a search engine application programming interface (API), and further allowing retailers 155 and/or consumers 300 to purchase those goods, such as via a suitably configured ecommerce purchasing platform. Additionally, such uploaded content may be managed by a content management system 207.

Any suitable computing system 205 may be employed in this manner so long as it is capable of accessing one or more databases 210, running one or more algorithms with respect thereto, so as to effectuate one or more actions, such as for the listing and/or purchasing of goods 116. For instance, the computer system 205 may be implemented in a simple processor running software that allows a user, such as a producer 151, manufacturer 152, retailer 155, and/or consumer 300 to list goods for sale 114 and/or to effectuate the sale of such goods 116, and/or may even function to effectuate the delivery of such goods 118, once purchased. For such purposes, the computer system may be an integrated circuit 205, such as a processor, that is configured for fetching instructions and making commands with respect thereto, or may be a dedicated hardware system that is hardwired for doing the same, such as in a wired configuration, such as for accessing a database and/or associated memory 210 so as to store and/or retrieve information therefrom. As explained herein below, in some instances, the system may also include an artificial intelligence module for analyzing one or more aspects of the system, to determine trends with respect thereto, to make predictions based on such trends, and/or to suggest or implement various configurational changes to the system in response.

Accordingly, a part of the system 2 may be a database 210 such as for storing data, such as data pertaining to inventory 100, such as raw materials 110 or finished goods 112, that may be offered for sale 114 and/or purchased 116, and/or delivered 118 (e.g. see FIG. 1). Such a database may be any suitable memory such as a dynamic random access memory (DRAM), single in-line memory (SIMM), dual inline memory (DIMM), e.g., that is accessible over a DDR interface, PCIe bus, and the like. Particularly, the memory 210 may be configured so as to be written to, so as to store a digital representation of various classes of goods to be sold, and may further be read from so as to display the offered goods for sale. It is also to be noted that while the database may be held in a memory, e.g., a solid state memory, the database may also be stored on disk, thereby securing against system outage.

Hence, a user of the system, such as a retailer 150 and/or consumer 300, may access the memory 210 via the cloud-based web portal 200, e.g., via processor 205, so as to upload, review, analyze, compare, and/or ultimately sell and purchase the goods 118. For instance, a producer and/or retailer 150 may engage the processing unit 240a, such as a personal or laptop computer, mobile computing device, PDA, or the like, so as to access the web portal 200 and upload one or more images of goods to be sold, such as images of the goods stored in the database 245a representing the inventory of the producer or retailer 150. Likewise, the consumer 300 may engage his or her processing unit 240b, such as a personal or laptop computer, mobile computing device, PDA, or the like, so as to access the web portal 200, so as to review one or more images of goods to be purchased. The consumer may then also use the system 2, so as to have the purchased goods delivered to the consumer's identified location, thereby making them delivered goods. In various instances, the system 2 may be configured for tracking the goods throughout the various steps of the process from becoming inventory for purchase to purchased goods and/or delivered goods.

Figure 3:
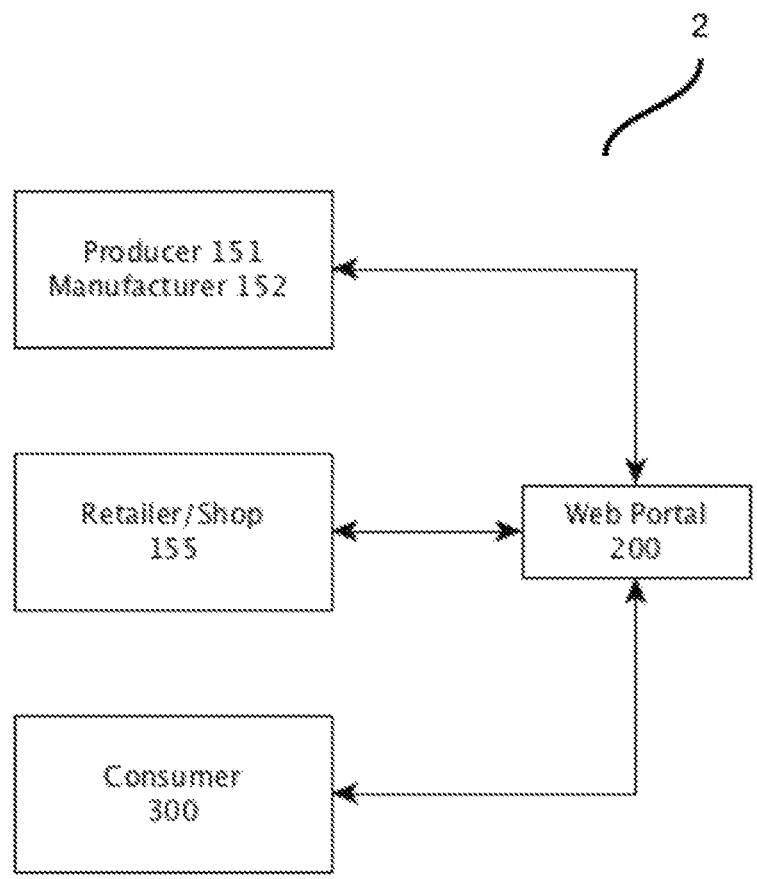
FIG. 3 shows a schematic diagram of information flow in systems of the instant disclosure.

Particularly, as can be seen with respect to FIG. 3, in various instances, the system 2 may be configured so as to provide the necessary interconnectivity and the flow of information to the database 210, and its users 150/300, regarding the various products at their various stages of production, and their availability for purchase, e.g., at each stage of the purchasing and/or acquisition process. The flow of information provided by system 2 allows the producer, manufacturer, and/or retailer 150 as well as the consumer 300 to track the goods through the purchasing process. In such an instance, the producer 151 may log onto the system 2 so as to upload raw materials into the system for purchase, which raw materials may be purchased by the manufacturer 152 and/or retailer 155 and converted or processed into finished goods. For example, a baker may receive farm fresh products that are then used to produce a baked good such as a cake, or a florist may receive flowers that they combine and arrange into a bouquet. Once received and finished, the finished goods may then be re-uploaded into the system 2 and offered for sale.

A consumer 150/300 may then log on to the system 2, may browse the various vendors 150 offering goods for sale, and may review and select the desired goods for purchase. Hence, the system 2 may be configured so as to allow the consumer 300 to view various different vendors 150 offering products for sale, to select the products desired, to purchase the products, and/or have them delivered. As can be seen with respect to FIG. 3, the system 2 may be configured so as to allow various market participants to interact with one another in a variety of ways. As indicated, producers 151 and/or manufacturers 152 can engage the system 2 to sell products, e.g., inventory 100 (see FIG. 1), to other retailers 155 or directly to the consumers 300. Likewise, the retailers 155 may use the system 2 to purchase goods, e.g., raw materials 110, from the producer or manufacturer, and/or to sell finished goods 114 to the consumer 300 (see FIG. 1). Additionally, the consumer 300 may engage the system 2 to purchase goods 100 from either the producers/manufacturers 150 and/or the retailers 155.

In some embodiments, a user other than the consumer can browse the inventory, place an order for the consumer, and have the craft items delivered to the consumer. For example, a health care provider (such as a doctor or nurse) or nutritionist may be able to browse the inventory of a shop offering unprepared and prepared foods utilizing produce and other ingredients considered organic and/or non-GMO. This can be useful for a consumer who desires and/or requires monitoring of the food quality being purchased over time. In some embodiments, a user other than the consumer, e.g. a health care provider or nutritionist, can assess the content of past orders via a client having access to the account of the consumer. In some embodiments, a user other than the consumer, e.g. a health care provider or nutritionist, can view and/or approve delivery of an order created and placed by the consumer.

In various instances, the system 2 may also be configured to provide feedback to the producer, manufacturer, and/or shop or vendor 150 regarding the sales of goods and/or the need to increase or decrease production of items in inventory 100 that are being sold or to be offered for sale. The feedback may be based on the purchasing trends of the various retailers 155 and consumers 300. For instance, if various items are being sold at a more rapid rate than in the past, the system may be configured so as to instruct the seller 150 to purchase more inventory or raw goods, so as to meet the increased consumer demand. Likewise, if an item is selling at a less rapid rate than in the past, the system 2 may be configured so as to instruct the seller 150 to forestall the purchase of more inventory, e.g., craft goods 100 or raw goods 110 (see FIG. 1), until current inventory has begun to move more rapidly. Further, as described herein in greater detail below, the system may be configured to effectuate or otherwise allow the delivery of the raw products /finished goods /purchased goods from the inventory to the retailer 155 and/or consumer 300. Hence, shops and vendors using the systems 2, apparatuses, and methods herein disclosed will be able to quickly and easily offer various goods in various conditions of production and/or manufacture for sale to a larger consumer base, while also being able to manage the inventory they are selling via the web-based portal 200 (and/or in the shop), track inventory sold online and/or within the shop, as well as receive customer orders for products via the web page, manage payment by customers via the web page, and coordinate delivery of the products to the customer 300 who placed the order.

Returning to FIG. 2, the systems 2 described herein may include at least one web portal 200 having a database 245a, such as configured for operating as an online marketplace, which database 245a includes data, e.g., inventory data stored in a memory 210 that is accessible by one or more suitably configured processors, e.g., 240. For instance, one or more applications, e.g., to be run by the one or more of the processors of the system 2, provide access to the data in the memory 215. For example, while the processor 205 may be engaged, e.g., via the web portal 200, so as to effectuate the display of items for sale 114, various applications of the system 2 may be employed to allow a user, e.g., 155 and 300, to scroll through various pages of displayed data regarding those items for sale, to review information about the items, and to effectuate an online purchase and delivery of those items.

Consequently, the system 2 may be used to store inventory data, order data, fulfillment data or inventory storage facility data, payment data, delivery data, and/or other data. The system 2, therefore, functions to track and manage the data related to inventory (e.g., number of items for sale, types of items, age of item, allocation for sale and/or delivery, raw materials used to make the items, quantities of raw materials in storage, as well as time to receive raw materials, make, and deliver the items; see below) in order to enable the shop or vendor 150 to quickly assess various aspects of the inventory 100 in relation to the rate of sales and/or delivery of the items to the end purchaser, e.g., consumer 300.

However, the shop or vendor 150 may be selling items both within the brick and mortar store itself, as well as via one or more webpages of the system 2. Hence, to truly keep track of inventory 100 for sale 114, the vendor 150 must keep track of inventory 100 that is sold or to be sold both through its brick and mortar stores as well as the online store 200, which allows a consumer 300 to browse for and purchase items online. In such an instance, the system 2 should be configured so that the data store 200 allows inventory tracking, such as by communicating with both webpage ordering (either part of or outside of the web portal 200) and point-of-service selling technology, such as at the brick and mortar store. The system 2, therefore, provides various software applications that both functions for the purpose of transferring inventory-related data and allowing a consumer to order items for delivery 400 and/or pickup at the store, while assessing and adjusting inventory data accordingly.

In various instances, the system 2 may also include applications and data that not only allows a consumer 300 to view available items, prices, descriptions, pictures, videos, and other information about a selected item, and then order the item for delivery 400, such as within a given time period, while at the same time tracking what the consumer 300 views and for how long. The ordering data may then be assessed with the inventory data to ensure that the items 100 are available. The system may also take and process payment by a consumer that orders items 114 from the inventory 100. The system 2 may also include data and applications that assess orders received from consumers 300, and determine an optimal delivery route and time, given delivery locations, number of vehicles providing delivery services, etc.

Accordingly, the system 2 may include a database 210 that stores data regarding individual items in an inventory 100 of the craft/small-batch merchant, such as title, description, picture of the item, price, weight, available quantities at the fulfillment center or materials handling facility (such as the craft goods shop), delivery availability, and/or other data. The system 2 allows the shop or merchant 155 to actively and/or automatically track the existing inventory of items and determine whether items are available or unavailable for sale to a consumer 300. The inventory data may be initially entered by the craft goods shop manually, and then as items 116 are sold and/or delivered 118, the system 2 may automatically adjust the inventory data, and in some instances, as new inventory 100 is acquired the system may track and adjust for that as well. In some instances, inventory data may include a picture of the item 114 to be sold, which picture may be taken of the actual item being sold. However, in various instances, the picture or image to be displayed may be selected from a pre-populated list of stock images provided by the associated database 210 of the web portal 200, allowing the shop user to more quickly and easily add inventory data.

In order for a consumer to view items available for purchase from a craft store, a streaming loop of inventory data, such as images and text may be made available through the web portal 200 to a consumer 300 (see FIG. 2). This inventory data may be loaded via a content input device 250 by a user. Content input device 250 may be a device used by store 150 to supply text, as well as still and/or moving images (e.g. movie files, .GIF files), and the like, to database 210. Exemplary content input devices may include desktop or laptop computers, tablets, smartphones, and the like. The content input device 250 may also include a communications module 252 having a transmitter and a receiver that communicates with cloud data server 205 via a network. The communications module 252 may use wired communication (e.g. Ethernet cable) and/or wireless communication (e.g. WIFI, BLUETOOTH, Low-Energy BLUETOOTH, etc.).

Content input device 250 may include or connect with a media database 254 that contains still and/or moving images of items available for purchase from store 150. A media engine 256 can access the media database 254 and provide images stored in the media database 254 to a media display loop 260. An editor 258 may also be associated with media engine 256 that allows a user to edit and modify characteristics of the images in the media database (e.g. size, color, contrast, etc.). A user can input images from media database 254 into media display loop 260 via media engine 256. The images and text presented by media display loop 260 are streamed through web portal 200 to a consumer for browsing and ordering the corresponding items in inventory. The streaming display of images may include specific text or other data associated with each image; such associated text or other data may be obtained from database 210 or may be obtained from a database associated with the content input device 250.

In some embodiments, content input device 250 may also include an advertising module 262 that can display virtual coupons to a user based on their order history, input or determined preferences, on geographical data, and/or other data obtained from the user. The advertising module 262 catalogs a user's order history, may access publically or entered data about the user, and may then compare items in the historic order to a database of coupons to identify any relevant coupons for identical or analogous items that the user has ordered in the past. In some embodiments, the coupon may be for an item that is not the same item type, but is for an item that is used with the ordered item. For example, if a user has ordered a cake in the past, then the advertising module 262 may find coupons for ordering smaller pastries in the coupon database. If a coupon and/or discount code is found by advertising module 262, the coupon may be pushed to a user, such as a banner or box on the user display, an email, an SMS text message, or other mode of communication. In various instances, the advertising module 262 may be configured for real-time generating and distributing a user specific advertisement to the user, e.g., based on determined or predicted user data, where the advertisement may include selectable components, such as an advertisement template and one or more media assets, e.g., stored in an associated database, the advertising module may be configured for real-time compiling and formatting of the advertisement, e.g., based on user specific data (and/or metadata obtained from their user of the system and/or internet generally), and for the broadcasting of the generated advertisement to the user, such as based on their usage of the system.

In some embodiments, content input device 250 may itself be cloud data server 205, and include media database 254, media engine 256, editor (e.g., project builder, compiler, builder, and the like) 258, media display loop (rendering engine) 260, and/or advertising module 262. In such instances, store 150 may access content input device 250 via web portal 200 to select stock images from media database 254 and load them into media display loop 260.

Figure 4A:
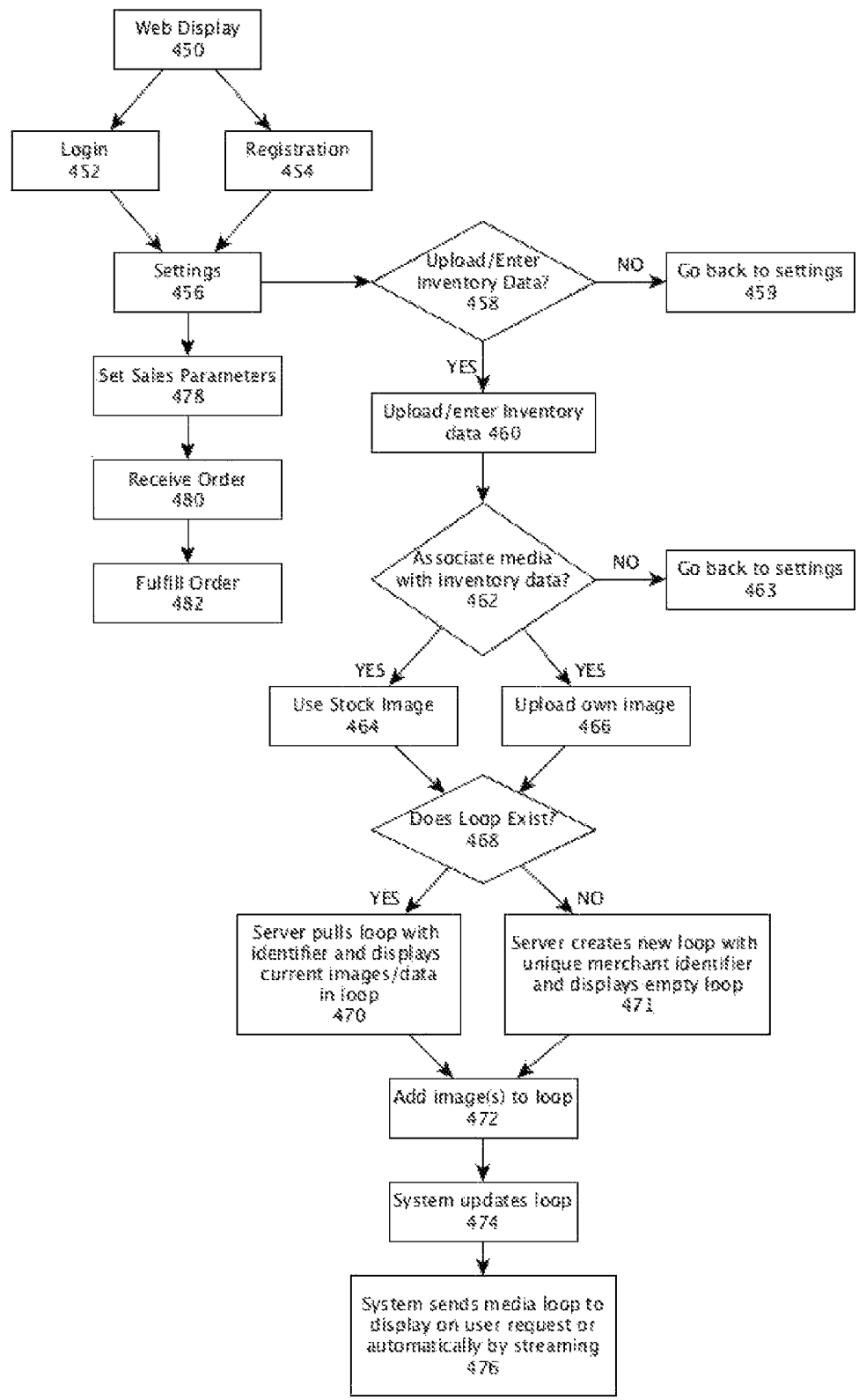
FIG. 4A shows a flowchart of method for a merchant setting up an online store.

FIG. 4A shows a flow chart of a merchant or user from a shop setting up an online store and using the system. At step 450, a store wishing to utilize the web portal and systems described herein accesses the web portal via a graphical user interface on a display. The web portal offers the option of registering the store in the system at step 454, or logging into the system at step 52 using credentials already chosen by the user (e.g. store owner/manager/employee). Various types of registration information may be received by the web interface, such as user name, user email address, password, store or business name, business address or geographic area, types of goods sold, estimated sales volume, payment information, etc. Confirmation of the registration may be accomplished by sending a confirmation email containing a link or code that is affirmatively used to verify the user and/or shop. In some instances, the system may alert a person that calls or emails the user trying to register to confirm their identity.

Once a shop user has successfully registered and logged in to the system, at step 456 the web display prompts the shop user to enter various settings to be used by the system for online sales. In step 458, the shop user manually enters or uploads inventory data to the database. If the user decides not to upload or enter inventory data, they are returned to the settings at step 459. In step 460, the shop user then uploads and/or manually enters inventory data into the system. Media, such as still or moving images, may be associated with data associated with a given inventory item at step 462. If no media are to be used, or will be entered at another time, step 463 allows the shop user to return to settings. If the shop user wants to associate media with inventory data, the shop user is presented with the choice of using one or more stock images stored in a database at step 464, or uploading an image of their own at step 466. In some embodiments, the stock image database may be browsed by the shop user to find a suitable image, or one or more stock images may be suggested by the system given a product name or description entered at step 460.

At step 468, the system may check whether a loop exists that is associated with the shop. If no loop is found to be associated with the shop, at step 471 the server creates a new loop with a unique merchant identifier and displays the empty loop. However, if a loop is found to be associated with the shop, then at step 470, the server obtains the loop with the matching unique merchant identifier and displays it to the shop user. Images may be added to the loop at step 472, such as by drag-and-drop of a user's own image(s), or by clicking and selecting image(s) from the stock database of the system. At step 474, the system may automatically present the loop of item images and/or associated text to a consumer, or the system may present the loop of item images to a user when the user requests the loop for the shop.

After inventory data and associated images have been loaded into the system, at step 478, a shop user may set sales parameters for individual types of items in inventory, or for groups of item types in inventory. Exemplary sales parameters may include a maximum number of orders to take in given time period, specified days and time periods for taking orders (e.g. take orders up to 30 minutes prior to shop closing), maximal delivery area (e.g. zip codes), delivery fee, and the like. Once a consumer has placed an order, at step 480 the shop receives the consumer order, and the shop fulfills the order at step 482.

Figure 4B:
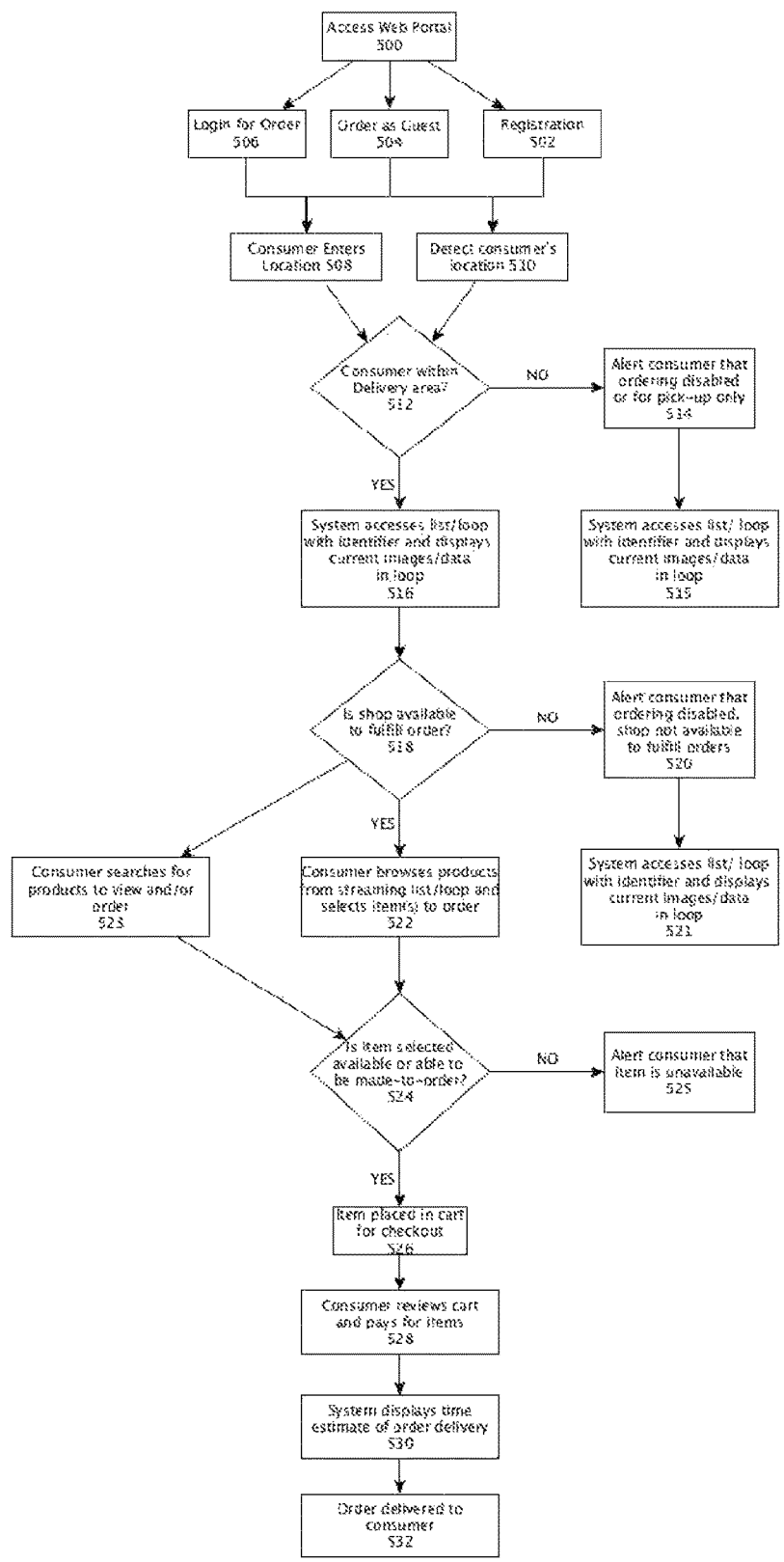
FIG. 4B shows a flowchart of a method for a consumer ordering from an online store.

Consumers using the online system described herein may order items from an inventory of a craft goods shop. FIG. 4B provides an exemplary flow chart of steps that a consumer may take when interacting with the instant system. The consumer accesses a web portal at step 500 via a client, such as a smartphone, tablet, or computer. The web portal displays options available to the consumer. For example, if the consumer has not registered with the system and would like to have their address, delivery, and/or payment information saved, at step 502 the consumer may register in the system, saving information such as their name, delivery address, email address, credit card information, etc. in a system database. At step 504, a consumer may also place an order as a guest by entering information such as name, delivery address, and payment information. The guest information is used to execute payment and delivery of the ordered items, but is not saved in the system. It is to be noted that this form of information may be saved in the system, and may be stored both with respect to the order and/or separately, such as on a 'customer' record. In one use model, such information may not be retrievable by the user until they register an account. Accordingly, at step 506 allows a consumer that has previously registered with the system (e.g., at step 502) to login to the system. The login step 506 allows a consumer to order items without having to re-enter delivery address and/or payment information on successive visits to the web portal.

The system may utilize a location of the consumer to determine whether the shop may be able to deliver one or more items to the consumer, and/or to generate and distribute an advertisement to the consumer based on that location and/or user determined data. For example, at step 508, the consumer may enter delivery location information, either at the registration step 502 or from entering the system as a guest. Exemplary location information may include an address, postal code, city, state, geographic coordinates, and/or some other form of location. In some embodiments, the system may automatically detect the location of the consumer at step 510 using the IP address being used by the consumer to access the web portal. The IP address may be compared with one or more databases to determine an approximate location of the IP address being used by the consumer.

At step 512, the system ascertains whether the consumer is within a delivery area specified by the shop by comparing the location of the consumer or the consumer's delivery address to the shop-specific delivery area. If the delivery location specified by the consumer and/or detected by the system is not within the delivery area specified by the shop, then at step 514 the system alerts the consumer that ordering for delivery is disabled, and disables ordering. In some instances, the system may allow ordering for pick-up only. Additionally, it is noted that some stores may offer national shipping, e.g., on a state-by-state basis, as an alternative to delivery and pickup. Once the consumer has been alerted that they are outside of the delivery and ordering has been disabled, at step 515, the system may access a streaming list or loop using an identifier specific to the shop and display the streaming list or loop to the consumer, allowing the consumer to browse the items in inventory. If the system determines that the consumer and/or the consumer's delivery address is within the delivery area for the shop, then at step 516 the system may access a streaming list or loop using an identifier specific to the shop and display it to the consumer via the web portal.

In some embodiments, at step 518 the system may determine whether the shop is available to fulfill the order. The system compares the day and/or time at which the consumer is accessing the web portal and compare the day and/or time to days and times the shop has set up as being available to receive and fulfill orders (e.g., see FIG. 4A). If the shop is not available for fulfilling orders, at step 520 the system alerts the consumer that ordering is disabled and that the shop is not available to fulfill orders. In some instances, once the consumer has been alerted that they are outside of the delivery area and ordering has been disabled, at step 521, the system may access a streaming list or loop using an identifier specific to the shop and display the items in the streaming list or loop to the consumer, thereby permitting the consumer to browse the items in inventory. If the system determines that the shop is available to fulfill orders, then at step 522, the system accesses a streaming list or loop using an identifier specific to the shop, and allows the consumer to browse the shop's inventory and mark one or more items for order, pick-up and/or delivery and/or shipping. The streaming list or loop may include text and images (including rendered or video content) describing each item in the inventory and selected by the shop for display. At step 523, the system may allow the consumer to search for items having specific characteristics, such as type, name, price, etc.

At step 524, the system determines whether an item selected by the consumer is available for purchase and/or delivery, or can be made-to-order for delivery. If the item selected by the consumer is not available for delivery or cannot be made-to-order within a timeframe pre-determined by the craft shop, then at step 525 the system alerts the consumer that the item is unavailable. In some embodiments, if the product or item requires a certain amount of lead-time to be made, the system may inform the consumer as to the amount of lead-time required. If the system determines that product or item is available or may be made-to-order with a predetermined timeframe by the craft shop, then at step 526 the selected product or item may placed in a virtual shopping cart for later review and ordering by the consumer. The virtual shopping cart data may be stored by the system, by a device used by the system, or both.

At step 528, the consumer can review a list of items in the virtual shopping cart, removing items that are no longer desired by the consumer, changing quantities of items. Additionally, special instructions with respect to individual items may also be included. In some embodiments, the consumer may return to browsing and/or searching for additional items to order. Delivery fees may be estimated by the system and listed along with the prices of the selected items in the virtual cart. The consumer then pays for the item and the listed delivery fees, such as by entering a credit card or debit card information, or by interfacing with a third party payment service which bypasses the need to manually enter credit/debit card information for every order, or provides credit for a fee. Exemplary third-party e-commerce payment companies include PAYPAL, AMAZON PAYMENTS, STRIPE, and BRAINTREE. Additionally, as discussed herein below, in various instances, the system may be configured for conducting transactions via a suitably configured cryptocurrency protocol.

At step 530, the system may then determines a time estimate for delivery of the items ordered by the consumer, based on inventory information and/or time to produce or finish the items. In some embodiments, a time estimate for the ordered items' availability for pickup may be displayed. In some embodiments, fulfillment of the order may be indicated to the consumer, as well as data and/or time the order is sent out for delivery. At step 532, the order is delivered to the customer at the location requested by the consumer.

In various instances, the system may be configured, e.g., via software or in a hardwired configuration, for tracking raw materials and/or inventory data. Referring to FIG. 2, this allows the merchant or vendor 150 to easily keep account of or otherwise track inventory 100, in the case of a simple re-seller or retailer, or raw materials 112 received from a supplier (or created by the merchant or vendor), in the case of a manufacturer 152. Inventory 100 or raw materials 110 may be tracked through receipt or production through ordering by a consumer. Likewise, the system 2 may be configured so as to allocate the selected items that are in the shop's physical inventory as available for sale, and/or to allocate selected items to a specific customer, such as during a remote purchasing transaction. Such tracking of raw material and/or inventory data allows the shop or vendor 150 to easily assess whether the inventory stock is low for a particular type of item, or if the item is sold out, fully allocated, or otherwise no longer in the shop's inventory. Further, in various instances, as described in detail herein below the system may be configured for implementing a blockchain protocol by which to track the various products and/or tracking the transactions of the system.

In particular instances, if the shop or vendor 150 is a producer or manufacturer 152, and thus manufacturers or otherwise produces or makes the items in inventory 100, the system 2 may be configured so as to alert the shop as to a low level of a particular type of item that is rapidly being depleted in the inventory so that the shop can then increase production of those item. Likewise, if raw materials are needed to make the particular item, then an application in the system 2 may automatically contact an ordering system for the supplier 151 of the raw materials so as to effectuate an order of those raw materials.

Additionally, if the shop or vendor makes items in the inventory (such as a bakery or sandwich delicatessen), the system 2 may be configured so as to determine one or more initial production rates for one or more particular items in the inventory. The initial production rate may be an estimate entered into the system 2 by a user, such as by an employee of the store or vendor 150. The system 2 may also be configured to assess changes in the size of the inventory one or more times on a daily, weekly, or monthly basis and provide alerts and/or recommendations to a shop or vendor 150 on increasing or decreasing the shop's rate of production to maintain an optimal inventory 100 level and/or amount of raw materials 110. For example, such alerts and/or recommendations may be based on a comparison of production rates vs. sales rates. Hence, the system allows the craft goods shop 150 to more easily minimize waste that may occur due to overpurchasing raw materials 110 and/or finished/partially finished goods 114, as well as alerting the craft goods shop of the need to purchase additional raw materials 110 and/or finished/partially finished goods 112 and maximize sales of goods by the shop, both in its physical location and/or online.

Accordingly, with respect to sales at a physical location, the system 2 may be configured to interact with one or more point-of-sale devices or clients running one or more point-of-sale applications that the shop 150 uses to sell items from within its physical location. In such an instance, the system is configured so as to be able to receive sales data regarding in-shop sales from the one or more point-of-service clients, and allocate available item(s) in the inventory data as being available for sale, e.g., prior to purchase, or unavailable for sale, such as after purchase. Likewise, the system 2 may be configured for allocating and tracking online purchases, and may further be configured to effectuate delivery such as from the shop 150 or a centralized storage facility. Adjustment of the inventory data by the point-of-service client and/or via the online interface 220*a,b* then affects the production estimate created by the system 2, so that the shop can more accurately streamline its inventory 100 and ensure that inventory is available for sale and/or delivery, e.g., to customers outside of the shop.

Figure 5A:
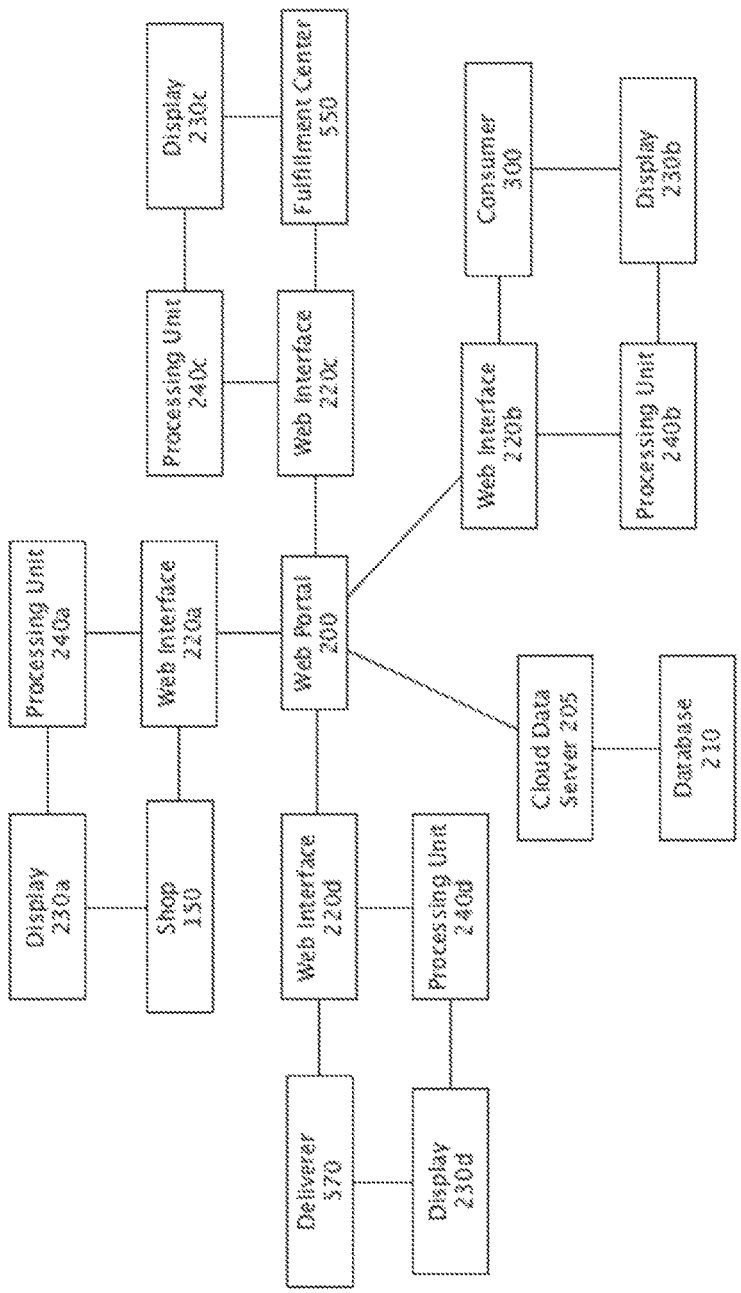
FIG. 5A shows a schematic diagram of relationships between a shop, a fulfillment center, and a deliverer.

In some embodiments, the systems described herein may include packaging and/or delivery functions to assist the shop in fulfilling orders and having those orders delivered to a consumer. FIG. 5A shows the relationships between web portal 200, shop 150, a fulfillment center 550 and a deliverer 570. As described above (see, e.g., FIGS. 2 and 4B), a consumer 300 communicates with web portal 200 to place an order of one or more items. Data regarding the order is communicated to cloud data server 205 and database 210 to update the shop inventory. Cloud data server 205 pushes data regarding the order through the web interface 220*c* of a fulfillment center 550 that accesses the information via display 230*c* and processing unit 240*c*. Fulfillment center 550 may be a separate location from shop 150, however in certain embodiments, fulfillment center may be located within shop 150. Users and/or machines at fulfillment center 550 then make and/or select items within the order, and package the one or more items in the order into discrete units (e.g. using containers such as bag or box) for pick-up and delivery by a deliverer 570. After the order has been packaged by fulfillment center 550, fulfillment center 550 notifies cloud data server 205 via web interface 220*c* and web portal 200.

As multiple orders for delivery are communicated to cloud data server 205, the cloud data server may identify and mark orders for delivery within similar delivery areas. These order delivery groups may be communicated back to fulfillment center 550, so that users and/or machines in fulfillment center 550 can group orders for delivery within similar delivery areas together for pickup and delivery by a deliverer 570. In some embodiments, the grouping application to group orders for delivery may be executed by processing unit 240*c* of fulfillment center 550. Users and/or machines at the fulfillment center 550 can then group orders together in preparation for pick-up by a deliverer 570.

Deliverer 570 may then pick up an order group for delivery within a certain delivery area. Deliverer 570 may be a driver in a vehicle employed directly by the craft goods shop, or it may be a third party delivery service. Deliverer 570 has a computing device, such as a smartphone, tablet, or other device that is in wireless communication with cloud data server 205; the computing device includes a processor 240*d*, a display 230*d* that displays a web interface 220*d* for interfacing with web portal 200. The route that deliverer 570 uses to deliver a group of orders within a delivery area may be created by a delivery route application executed by cloud data server 205. In some embodiments, the delivery route application may be executed by the processing unit 240*c* for fulfillment center 550. The delivery route data may be transmitted to processing unit 240*d* of deliverer 570 and shown by display 230*d*. Deliverer 570 follows the delivery route to deliver the order to consumer 300.

After a group of orders has been loaded with a deliverer 570 at the fulfillment center 550 for delivery, the fulfillment center may notify cloud data server 205 that each order in the delivery group has gone out for delivery. A consumer 300 can thus access web portal 200 via web interface 220*b* and determine whether and/or when an order left fulfillment center 550 for delivery.

Figure 5B:
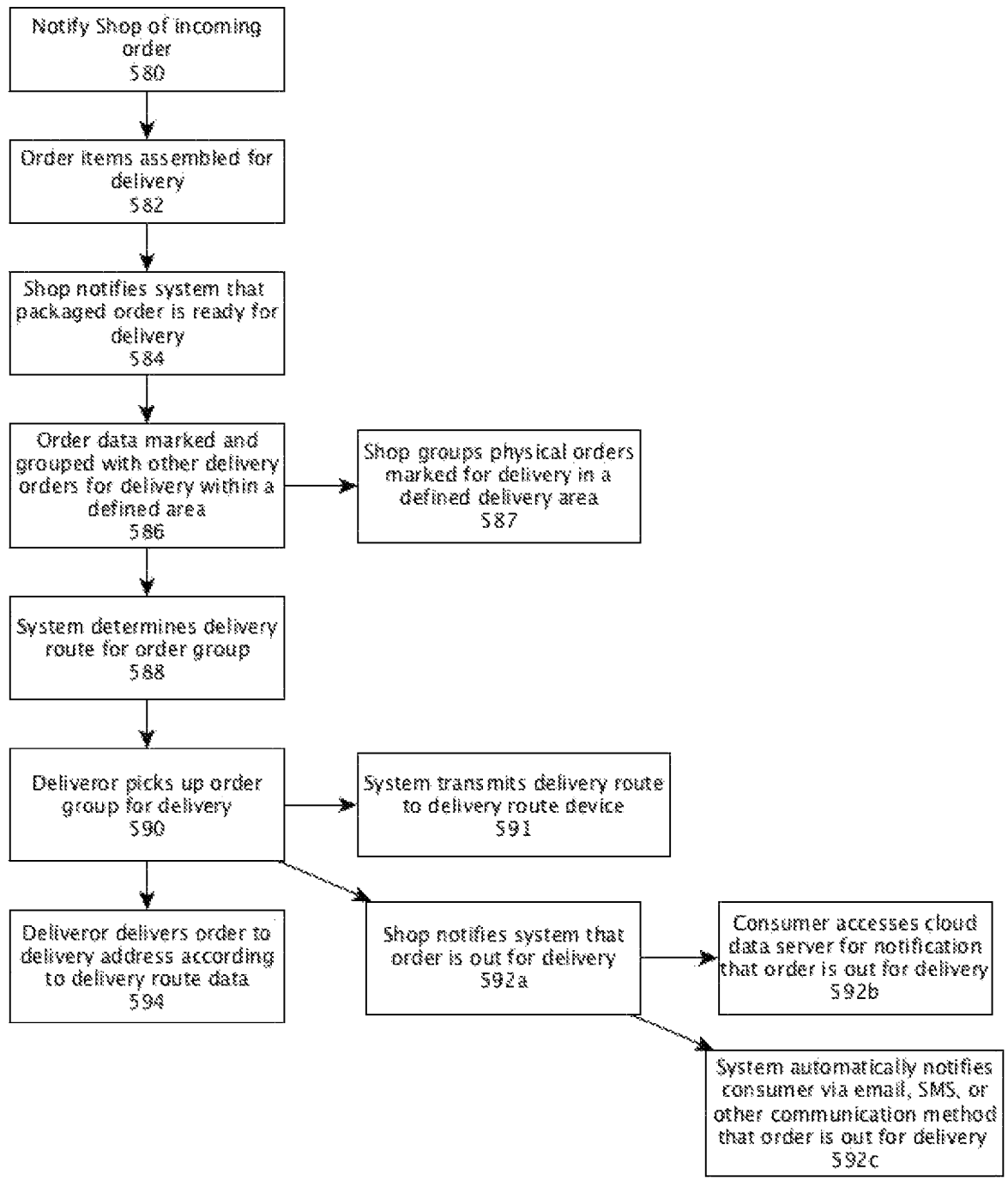
FIG. 5B shows a flowchart for receiving, packaging, and delivering an online order.

FIG. 5B shows a flowchart for receiving, packaging, and delivering an order using the system as described herein. In the steps depicted, the craft goods shop physically includes the fulfillment center; however as described above, the fulfillment center may be in a separate physical location. At step 580, the system notifies the shop of an order that needs to be assembled and completed, either for pick-up by the consumer or for delivery to the consumer. The order item(s) may then be created by the shop and/or packaged at step 582. Once the order has been packaged, at step 584 the shop notifies the system that the packaged order is ready for pick-up by the consumer or delivery to the consumer. If the item is to be delivered to the consumer, at step 586 a delivery application marks and groups the order data with other orders slated for delivery within a defined delivery area. As described above, the grouping application may be executed by the cloud data server or by a computing device that is local with the shop. At step 587, the shop may then group physical orders that are marked for delivery in a defined delivery area.

The system, e.g., via the artificial intelligence engine, may then determine a delivery route for an order group at step 588. The delivery route may be determined to optimize the speed of delivery. In some embodiments, the delivery route may be calculated by the cloud data server, for example using a delivery application. In certain embodiments, the delivery route may be calculated by a delivery application executed by the computing device at the fulfillment center. At step 590, a deliverer may pick-up an order group for physical delivery to consumers. The delivery route data may then be transmitted via wired or wireless communication to a delivery route device associated with deliverer at step 591. The delivery route device may then display route directions to a delivery driver, thereby providing route guidance to the delivery driver or to an automatically piloted delivery vehicle. Once the group of orders is loaded into a deliverer's delivery vehicle for delivery, at step 592a the shop may then notify the cloud data server that each order in the group has gone out for delivery. At step 592b, the consumer may then be able to access the cloud data server for the notification that the consumer's order is out for delivery. In some embodiments, at step 592c the system may automatically notify the consumer by email, SMS, or other communication method that the order is out for delivery. At step 594, the deliverer delivers the order to the consumer according to the delivery route data.

Figure 6:
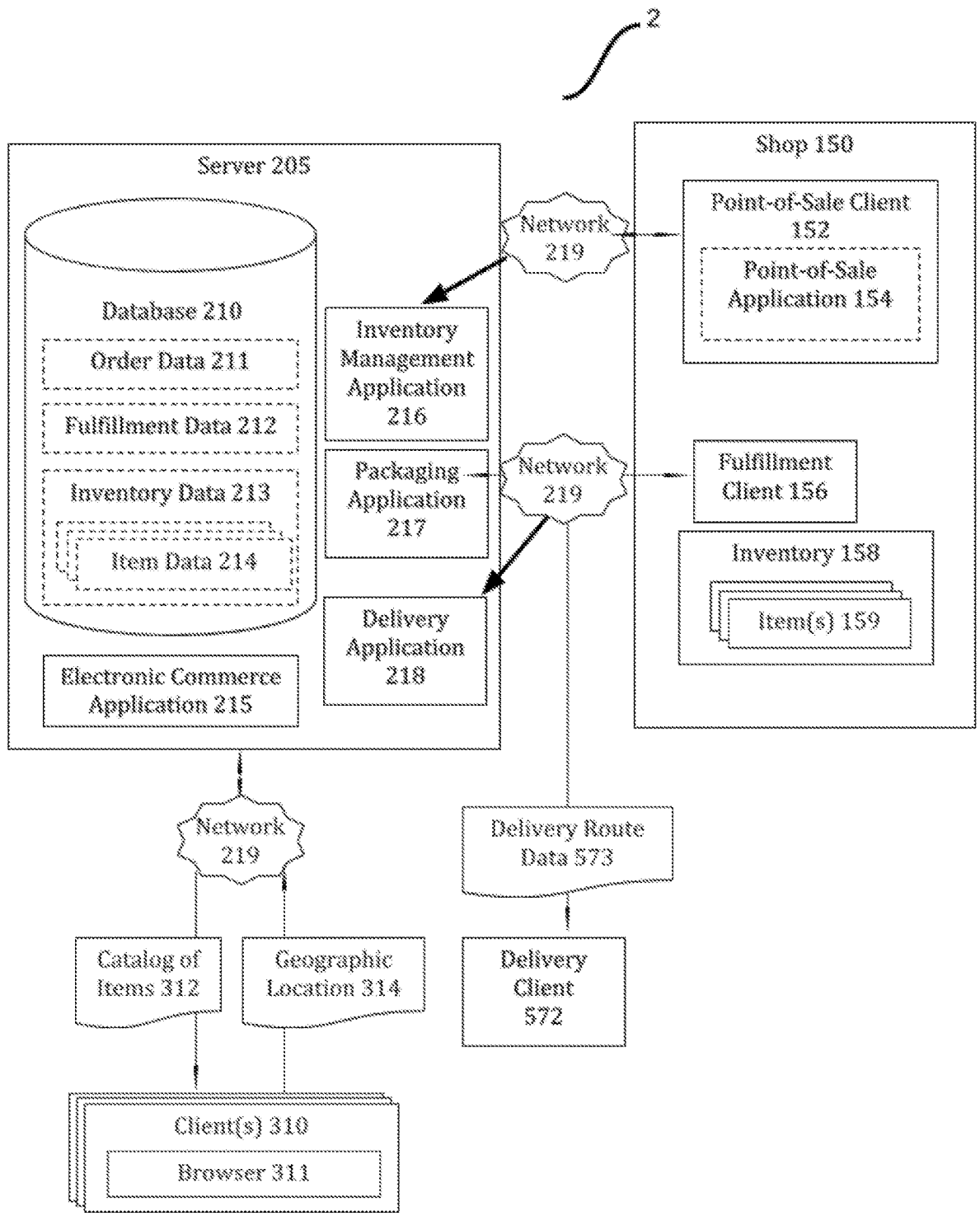
FIG. 6 shows a schematic diagram of an exemplary embodiment of a system for online ordering and delivery.

FIG. 6 shows a schematic diagram of an exemplary system that is networked with one or more consumer client apparatus and a delivery client. The system 2 includes a server 205 that has a database 210, which server 250 may also include or be associated with an artificial intelligence module. Database 210 may include (but is not limited to) a variety of data types, including inventory data 213, fulfillment data 212, and order data 211. Inventory data 213 may include various data related to specific types of items 159 in inventory 158 made and sold by a craft goods shop. Server 205 executes an electronic commerce application 215 that is accessed through web portal 200 by client(s) 310 that are controlled by one or more consumers. Client(s) 310 each have a browser 311 that interfaces with server 205 via web portal 200. Exemplary clients may include smartphones, tablet computers, laptop computers, and other computing devices. The consumer(s) are able browse a catalog of items 312, such as a streaming view as disclosed above, that is obtained from inventory 158. A consumer browses and selects the items 159 desired via client 310, or products are brought to the consumer's attention, e.g., suggested, for purchase by the system, and/or a relevant advertisement may be generated and delivered to the consumer, and then the consumer places an order through the electronic commerce application 215. In various instances, the electronic commerce application 215 may also be configured to receive geographic location data 314 from the consumer's client device 310. Such geographic location data 314 may be obtained from information entered by the consumer via the browser or via geolocation. In such instances, the location data may include one or more of a delivery address, city, state, postal code, geographic coordinates, and/or some other data that identifies a location. In some instances, the location of the user may be determined using geolocation technology using an identifier associated with the browser or client of the consumer. The location data of the consumer may be compared with delivery area data in the database 210 by electronic commerce application 215 so as to determine whether any portion of the inventory may be delivered to the consumer.

Additionally, in some instances, the delivery area data may be the same for all items in the purchased inventory; in other instances, more than one set of inventory data may be associated with different groups of items that have been purchased in the inventory data, such as where a consumer purchases two or more items to be delivered to two or more separate locations. Further, inventory data associated with purchased items that fall outside of the parameters for location delivery data may be indicated to browser 311 as unavailable for delivery, but as available to be picked up in a specified time window from the store location. In some instances, inventory data for items that do not match the consumer's location data may not be presented to browser 311 at all.

Once the consumer has selected the desired inventory item(s) for ordering, they may enter payment information into the electronic commerce application 215 via the browser or client, and indicate completion of the order. Payment by the consumer for the ordered items may occur by entering credit card/debit card information, or by use of a third-party application which bypasses the need to manually enter credit/debit card information for every order, or provides credit for a fee. Exemplary third-party e-commerce payment companies include PAYPAL, AMAZON PAYMENTS, STRIPE, BRAINTREE, and/or a suitably configured cryptocurrency. The electronic commerce application then updates inventory data for the item(s) ordered by the consumer, in order to ensure that existing inventory is properly allocated. Server 205 may then execute packaging application 217 to notify the shop that an order of items needs to be packaged for pick-up or delivery.

Server 205 may also include inventory management application 216 that tracks and allocates items 159 in the inventory database, as items are ordered by client 310 as well as purchased by consumers within shop 150. Point-of-sale client 152 is used by shop 150 to sell items 159 in inventory 158, using a point-of-sale application 154 executed by point-of-sale client 152. Point-of-sale client 152 communicates with inventory management application 216 via network 219, via a wired and/or wireless connection.

Electronic commerce application 215 may then trigger execution of packaging application 217, which communicates with fulfillment client 156 (e.g. smartphone, tablet, or other computing device) at shop 150. Packaging application 217 may communicate fulfillment data via network 219 to fulfillment client 156, thereby displaying an order that requires fulfillment by employees and/or machines of shop 150. Once the order has been fulfilled, a user may use the fulfillment client to notify packaging application 217 that the order has been fulfilled. In various embodiments, the packaging may be performed autonomously by a server of the system interfacing with a suitably configured autonomous packaging machine, such as a specifically configured packaging robotic mechanism.

Delivery application 218 may be executed by server 205 and receive fulfillment data, include geographic location of individual orders, as well as identify and group orders together that may delivered within a specified delivery area. The delivery application, and/or artificial intelligence module, then assesses the orders that need to go out in a given window of time, such as hours or portions of a day (e.g. morning, afternoon). The delivery application then groups orders together for delivery by a given delivery vehicle or service, with a route calculated for an efficient and optimal delivery time. In some instances, predetermined and/or optional stops for the route may be inserted into the route. Exemplary stops may include mandated driver breaks, stops for fueling, etc. Once an order grouping is determined, delivery application 218 notifies fulfillment client 156 as to which orders should be grouped together for delivery (once the individual orders are fulfilled).

Delivery route data 573 may be transmitted via network 219 to a delivery client 572 (e.g. smartphone, tablet) that is carried by a deliverer, such as a delivery person carrying orders in a vehicle. Delivery client 572 may display the delivery route data 573, indicating both the preferred route for delivery, delivery stops, and the specific orders to be delivered at a given delivery stop. The deliverer then uses the delivery client to complete the delivery to a consumer. In certain embodiments, such delivery may be implemented by autonomous delivery vehicles that may interface directly with the server for receipt and implementations of instructions thereby. Such autonomous delivery vehicles may include self-driving cars and/or drones.

In certain embodiments, consumer orders sent for delivery may be tracked by the system and/or consumer. Fulfillment data 212 may be updated throughout the fulfillment and delivery process. Data regarding the fulfillment of an order. When an order has been sent out for delivery, delivery application 218 may access delivery data including distance from the shop or fulfillment center to the consumer, time that the delivery vehicle departed, and estimated time of delivery. The consumer can then access the delivery information specific to the order via their client 310. In some instances, periodic or real-time geolocation data may be transmitted from the delivery client 310 to the fulfillment database, and then accessed by client 310 to update the delivery data. Once the order has been delivered to the consumer, this information can be transmitted from a delivery client 572 to the fulfillment database 210, to confirm that the order was successfully delivered.

Accordingly, in view of the above, an aspect of the disclosure is directed to tracking and accommodating the vastly changing commercial trends of society in the new millennia. Particularly, the later half of the 20$^{th}$ Century saw the rise of big box retailers, as well as the commoditization of products being sold en masse to a large crowd of consumers visiting those big box retailers. More particularly, with the advent of the internet, shopping trends in the new millennia are changing from a centralized brick and mortar retail location to a virtual presence on the internet where shoppers can visit a virtual market place.

However, another growing trend is a growing health concern in the products of commerce, especially with respect to groceries, such as produce. Consumers are tending to purchase more locally grown produce and manufactured products, e.g., craft goods, where the products being purchased are grown, sourced, manufactured, and/or assembled from the local community. Such producers, manufacturers, assemblers, and/or retailers are usually small, craft shops that are designed to service a local community with high quality, healthy, sustainable goods that are produced in a manner to minimize the carbon footprint of production, and the humane treatment of animals, as well as the growing of food in a healthy, more natural manner. Because these producers and retailers are typically small shops serving a local environment, they are often not equipped to provide larger markets, and hence, their growth and ability to provide their high quality products outside of their local presence in the community. Thus, others located outside of the community, or for those who like to complete their shopping online, are denied the access and ability to purchase these goods form these retailers. Specifically, this trend in local, craft-based sourcing often runs counter to the more global trend in internet shopping.

In some instances, the market has adapted to overcome the contrary nature of these two trends, such as by communities supporting local farmer's markets, and by large anchor stores creating a market place or bazaar for other smaller more local retailers joining together to form a centralized market space comprising a collection of smaller shops. In essence, in some instances, a larger store may form the hub for a spoke of smaller producers that joint together to form a larger market place, whereby a consumer can go to the centralized market place and shop from a variety of retailers. Nevertheless, this solution still suffers from the problem of requiring a shopper to actually travel to the marketplace in order to perform their shopping.

The present technology described herein are configured for overcoming these deficiencies in the market and to combine these two divergent trends so as to more particularly meet the needs of the consumer. Specifically, through the computer systems described herein, the present technology allows for a spoke and hub physical market place to be brought online, in such a manner that an anchor store, serving as the hub, as well as the other smaller stores, serving as spokes to the hub, may be presented virtually online by one or a series of webpages, and their separate inventories may be entered into the system, presented in one or more webpages, and be offered for sale as a single entity for tracking purposes, but as separate entities for accounting purposes. In a manner such as this, the technology herein provides an easy to use, intuitive interface, for creating a virtual market place that more closely models the actual physical presence of brick and mortar shopping. Hence, the present technology opens up these local, craft-good market places to consumers outside of the local community, and provides for the efficient delivery of goods purchased.

Further, another aspect of the present technology, is the collecting, boxing, and delivery of the goods purchased at such local hub and spoke market places, where a consumer can purchase goods, e.g., online, and have them delivered straight to their door, in an efficient, swift manner. In this manner the anchor store may serve as the hub for online sales, e.g., via a parent product page, where goods are presented in a series of categories, and the technology presented herein can track, organize, account for, and effectuate the delivery of the purchasers using the system, or each shop may have its one virtual presence, e.g., web page, which may be individually presented online or presented as part of the collective shopping network, whereby each small shop presents its own goods, and is responsible, or more specifically the system network is responsible, for supplying the ordered goods to the consumers who have purchased them.

The organization of such goods may be in any suitable manner, such as by products, such as by sources of those products, and/or by identification of regions where the goods are produced, and the like. For instance, in one instance, all merchants selling a specific product may be listed, e.g., by merchant name and/or region, or all products of a type may be listed, irrespective of where or who produced by, or goods may be listed based on prices for products presented for sale, or by dietary or ingredient features, and/or by how produced, and the like. In this manner, the present technology allows consumers, located remotely from the marketplace, to compare merchants, prices among all merchants and producers, such as on a product by product, or regional basis. Further, as presented herein, the system, e.g., an artificial intelligence module, can run analytics on who is shopping where, what they are buying, and can make suggestions based on increasing sales and/or promoting efficiency so as to allow any given shop to be more competitive in the market, or for the market place itself to be more efficient and easier for consumers to access, taking into account the changing trends in shopping.

Particularly, in one configuration, the system may include a remote server, such as a cloud based server, as described herein, which server may be connectable via a network to one or more client apparatuses, e.g., client computers and/or one or more client computing devices, such as a mobile telephone, tablet, or laptop computer. Such client devices may be positioned at a local producer of goods, e.g., a craftsman, such as a farm or site of manufacture or warehouse or centralized distribution location, at a retailer of goods, at a house or office of a consumer of the goods, or may be a device being transported by a distributor, e.g., a delivery vehicle, of the goods. Therefore, as explained above, the system may be configured for wired or wireless network connection and communication, whereby communication and/or transaction may be performed via one or more devices located remotely from one another may take place throughout the system. In particular instances, wired communication may take place or wireless communication may be conducted via a cellular, WIFI, or other network interface that is configured for effectuating the transfer of data from a transmitter to a receiver of a computing device of the system. In various instances the system may include a data processing module, for processing data prior to or after transmission.

Accordingly, communication throughout the system may be conducted via one or more communications modules employing one or more communications protocols over one or more networks. For instance, the various devices of the system may be configured for wired or wireless communication, and thus, may include a wireless transmitter, a typical transmitter may be a radio frequency (RF) transmitter, a cellular transmitter, WIFI, and/or a Bluetooth®, such as a low energy Bluetooth® transmitter unit. In some instances, a typical receiver may include a satellite based geolocation system or other mechanism for determining the position of an object in three-dimensional space. For example, the geolocation system may include one or more technologies such as a Global Navigation Satellite System (GNSS). Exemplary GNSS systems that enable accurate geolocation can include GPS in the United States, Globalnaya navigatsionnaya sputnikovaya sistema (GLONASS) in Russia, Galileo in the European Union, and/or BeiDou System (BDS) in China.

Specifically, as discussed herein, a feature of the disclosure is the delivery of purchased products to a remote consumer. As such, in various embodiments, the system, e.g., an artificial intelligence module thereof, may be configured for determining the fastest and most efficient delivery route while taking into account a number of producers from which to pick up goods for delivery and a number of consumers having deliveries being made to them. In such instances, the deliveries may be made by a vehicle, such as a bicycle, motorcycle, car, and the like. And in some instances, the vehicle may be autonomous, like a self-driving car, remotely or autonomously flown drone, and the like. In these regards, each of these instruments of delivery may be connected to a server of the system, their location may be determined, such as by a location mechanism, e.g., GPS, of the disclosure, and the system may be configured for determining their position automatically as well as determining the fastest and/or most efficient route for the delivery of goods and/or services to them.

Likewise, where a consumer of the system is using a computing device to perform an order, the system may automatically determine the location of the consumer so as to best determine the manner and route by which to deliver their purchases to them. For instance, as disclosed herein below, an aspect of the disclosure is a mobile application or "APP", which app is downloadable onto a mobile computing device, such as a mobile telephone, and configured to allow a user to rapidly connect to a server of the system, pull up a shopping dashboard at a graphical user interface of the device with which to browse the virtual marketplace so as to perform shopping, and to purchase goods, such as groceries, and to have them delivered to them. In such an instance, the system may be configured for automatically determining their location, such as via location data entered into the app or by the unique RFID of the device they are using in conjunction with the application, and the like, and once determined the system may then determine the best route for delivery of purchased product to them.

Additionally, in some instances, once the consumer's location is determined, the system may include an automatic add generator, as described herein, so as to produce and electronically deliver advertisements to the user of the system with respect to local producers and/or retailers that have a presence in the consumers' local region. These advertisements may be generated on the fly, based on data received by the computing device of the user, such as metadata, which data may include location data, preference data, search data, keyword data, and the like. Accordingly, in various embodiments, the system may be configured to track and/or monitor the transport and delivery of goods through the system, and in doing so may be configured for tracking the movement of one or more delivery vehicles, e.g., autonomous car or drone, and/or for tracking one or more individual good being delivered, e.g., to a consumer. Hence, in such instances the server of the system may include a receiver that is suitably configured for receiving a transmission, for instance, a signal, such as a digital signal, from the transmitter of a device and/or vehicle or drone of the system, so as to receive up to the moment position data of the vehicle.

Likewise, each good or quantity of goods travelling throughout the system, such as for delivery, may be electronically or digitally tagged and/or verified throughout one or more stages of the delivery process, so as to also allow for up to the moment tracking of the individual goods. Such tracking, therefore, may be conducted through one or more client apparatuses communicating with one or more servers of the system. In various instances, the client devices may be one or more desktop computers of one or more participants in the system, such as a producer, retailer, or consumer, or the device may be a handheld mobile computing device or other mobile device. In various instances, the goods and/or their delivery may be tracked via an application of the system, such as a downloadable application running on one or more of the client devices. For instance, in various instances, an integral part of the system may be a client application program, e.g., "App," which may be provided and distributed to one or more desktop or mobile devices of the system, where each of the devices has an interactive display, such as a capacitive sensing touch screen display.

For example, the various processes of the system, such as for the accounting, transacting, transporting, ordering, and stocking of the goods may be implemented by a computing system that includes a back-end component, e.g., a cloud based data server, being communicably associated with a database, e.g., of goods in the system, or that includes a middleware component, e.g., a local application server, or that includes a front end component, e.g., a client computer having a graphical user interface or a Web browser through which a user can interact with an implementation of the methods of the system, or any combination of such back end, middleware, or front end components.

Particularly, as discussed above, in various embodiments, a computer system may be provided where the computer system includes a remote server system, e.g., which may include a server and/or a client apparatus, such as a desktop or laptop computer, and/or a client computer, such as a mobile telephone device running the client application. Typically, the server and client are remote from each other and generally interact through a communication network. For instance, a server of the system may be a cloud based server that is in communication of a plurality of local servers and/or client computers that are located throughout a geographical region being serviced. Likewise, a delivery vehicle of the system, including a self-driving car or drone, may include a mobile communications device having a wireless communications module that is in communication with one or more of the servers and/or client computers of the system, such as via a wireless internet or cellular connection. Hence, the components of the system can be interconnected by any form or medium of digital data communication, e.g., a communication network. Examples of communication networks include a local area network ("LAN") and a wide area network ("WAN"), e.g., the Internet. Particularly, the relationship of server and client arises by virtue of computer programs or firmware, e.g., software programs and applications, or hardware configurations, running on the respective computers and having a client-server relationship to each other. In this instance, the client application may be an application program including machine instructions that, when executed by a processor cause the processor to perform certain programed functions, as herein described.

Accordingly, in various embodiments, the tracking of goods, e.g., inventory, throughout the system may be conducted through a client application, e.g., "APP", of the system running on one or more client devices communicating with one or more remote servers of the system. Particularly, the client application may be a downloadable software application that is adapted for being downloaded onto a client device, and configured for directing a host processor(s) of that device to perform one or more predetermined functions, including the presentation of a client interface, which client interface may present a dashboard through which interface data, such as ordering, stocking, producing, and/or inventory data, may be inputted, transmitted, and received, such as by a central server of the system. For instance, the client application may be configured for directing data transmission, through the endogenous communications module of the client device, back and forth e.g., between the device and the host server over a network connection via the application. In certain embodiments, the system is configured for receiving and transmitting data to and from a plurality of client devices, such as a multiplicity of communication devices, e.g., desktop computers and/or handheld cellular phones, running the same or similar programming. In particular embodiments, one or more of the delivery vehicles, including drones, and/or operators thereof may have a mobile communications device for communicating data, such as location, inventory, and/or delivery data, on a moment by moment basis, to a central server of the system.

Hence, in such embodiments, one or more, e.g., each, of the software implementations, e.g., client application programs, which may be run on a mobile communication device, may be configured with a device, e.g., mobile device, identifier (ID), for providing a unique device identifier for the device. In particular instances, the client application program of the mobile device further includes one or more of a user ID of a user associated with the mobile device, information about the user, and/or location data representing a location of the user and/or mobile device, so as to facilitate ease of tracking. Specifically, in various instances, a user of the system may engage with a server of the system, such as for uploading inventory, ordering goods, and/or tracking delivery and the like, through a downloadable client application program where each client application program may be configured to generate an interactive user interface that may be configured for being displayed on the interactive display of the client device, e.g., a mobile computing device.

Particularly, in certain instances, the interactive user interface may display one or more screens, where each screen is directed to a different aspect of the system. More specifically, the client user interface may be a graphical display for presenting a real-time list of product classes available, producers and retailers of those product classes, one or more inventory of goods for ordering, as well as methods for delivery, and the like. Each participant of the system, therefore, may engage with a server of the system through a desktop and/or mobile client computer, and the like, for the purpose of uploading and updating inventory, tracking the flow of goods, and making purposes, via the user interacting with the graphic user interface, and thereby allowing for real-time updating and tracking being performed by one or more servers of the system.

Accordingly, a central feature of the system is one or more servers, such as a remote and/or centralized server that is capable of being accessed remotely, such as via a cloud based interface. Particularly, as indicated above, in various instances, a server of the system is connectable to one or more of the associated client, e.g., desktop, mobile, devices via the client application program, such as over a communication network. The connection with the server may be such that the server automatically synchronizes the activities being performed within the system and across all devices, e.g., client computers and mobile device(s), real-time, so as to allow a user to see the flow of goods throughout the system and to track the state of inventory as well as the state of the different producers and retailers, e.g., with respect to the goods they are offering for sale, at any time. In such an instance, the server system may be configured for receiving one or more of the mobile device ID(s), the user ID(s), a vehicle or drone's ID, the user(s) information, and/or the location data for each user and/of each product and/of each delivery vehicle of the system, such as through one more client programs.

Particularly, in certain instances, the server may be configured for collecting, collating, and/or generating an aggregated state of orders made, state of orders pending, state of orders fulfilled, state of inventory, state of delivery, as well as provide data related to who is doing the ordering, from where, and at what time, and from which locations so as to track trends across the system. This data may then be aggregated, compiled, and one or more predictions pertaining thereto may be made such as via an artificial intelligence model of the system, which data may be then prepared for transmission to one or more of the client application programs and/or for display in the interactive displays of the system, or to a third party device for analysis thereof. In view of the above, an important aspect of the system is the provision of an interactive, real-time updating, commercial platform that allows for the offering, selling, purchasing, and delivery of products from a plurality of shops and vendors via a single, cloud based virtual market place that is accessible via an intuitive, easy to use client application, such as via a downloadable APP running on a mobile device or client computer.

Specifically, in one aspect, a server system is provided, wherein the server is connectable to one or more associated client devices, such as one or more mobile communication devices, such as a cellular phone, tablet computer, laptop computer, smart-watch, and the like. The one or more client devices may be configured so as to include the client application program, which may be a downloadable application, as described herein. More specifically, in particular instances, the server may be connectable to the client device and/or to one or more delivery vehicles, such as an automobile, driverless automobile, drone, etc., collectively client apparatuses, over a suitably configured network, such as via a wireless communications protocol, such as via a cellular, RF, Wi-Fi interface, over the cloud. Particularly, each of the client-apparatuses may include at least one processor, a transceiver to communicate with a communications network, and an interactive display.

In various instances, the apparatus may be communicably coupled to the server system, such as over the communications network. The connection may be such that it synchronizes the client apparatuses with the server, and at a time during which one or more activities of the stocking, offering, ordering, selling, and/or delivery processes are taking place. In such an instance, the server system may be configured for receiving one or more of the mobile device ID(s), the user ID(s), the delivery vehicle ID, the user(s) information, and/or the location data for each user of the system, such as through one more client programs. Further, the server system may also be configured to authorize one or more users of the system, such as a producer, retailer, consumer, and/or deliverer of the system, so as to allow them to participate in the commercial process; receive the orders/products inputted from the authorized users; and for delivering the ordered products, as described above.

Particularly, the system may be configured such that a multiplicity of such client apparatuses are capable of viewing goods offered for sale and/or delivery, displaying the goods, the delivery region and/or route, and/or commenting on and/or evaluating the goods and/or associated services, such as the delivery service, all of which may be viewable real-time by a plurality of users of a client apparatus of the system via the client application. More particularly, in certain instances, the server may be configured for collecting, collating, and/or generating aggregated inventory, order, and/or delivery data for one or more, e.g., all, of the goods in the system, from a number of users, and for the automatic transmission of real time updates to the plurality of client application devices, and/or for display thereby with respect to one or more products of the system. Accordingly, the server system may be configured for receiving user data, input data or otherwise, and processing that data so as to determine the real-time inventory and/or the activities of various of the users of the system.

Consequently, in various instances, the server may be configured for receiving and processing user and/or client apparatus data, and especially for receiving product offering, ordering, and/or delivery data. For instance, as indicated, the system may include a mobile ordering device that includes a client application together which may be configured for directing data transmission, e.g., offering and/or ordering, through the endogenous communications module of the client device, back and forth e.g., between the device and the host server, e.g., via the application. Specifically, in various embodiments, the system may be configured for receiving and transmitting selling, ordering, delivery, etc. data to and from a plurality of client apparatuses, such as a multiplicity of communication devices, e.g., desktop computers and/or handheld cellular phones and/or smart watches, delivery vehicles, etc. running the same or similar programming. Hence, in such embodiments, one or more, e.g., each, of the software implementations, e.g., client application programs, which may be run on a desktop computer, handheld communication device, and/or delivery vehicle, may be configured with a device identifier (ID), for providing a unique device identifier for the device, such as for identification, authentication, and/or tracking of the user. Additionally, as indicated, the client application program of the mobile device may further include one or more of a user ID of a user associated with the mobile device, information about the user, and/or location data representing a location of the user and/or mobile device, which may also be communicated to the server system, such as for authenticating the user and/or the user's location.

In certain instances, the system may be configured such that products for offer and orders may be entered and transmitted to the central server such as by engaging with a displayed graphical user interface generated at a client apparatus of the system. However, in other instances, the system may be configured such that the data to be input, e.g., product offering and/or orders made, may be entered such as through a voice command. In such an instance, the system may be configured such that a user may engage an activation switch or button, either physically or via voice command, and once activated may speak into a microphone of the device, so as to verbally enter data, e.g., product offering/ordering data, into the system.

Specifically, as explained below, in various instances, the system may include an artificial intelligence (A/I) module that may include a learning or training platform that is configured for learning the voice and words or phrases of a user, and may further include an inference engine that is configured for predicting the meaning behind the words and/or phrases employed by users, especially with respect to their use of the system to engage in, e.g., score, an event. As such, the system is capable of receiving voice commands from a user in their offering and or selecting of goods for sale and/or purchase. Particularly, as indicated above, the system may include a downloadable app that is capable of being downloaded and/or otherwise installed on a user device, e.g., a desktop, laptop, or other mobile computing device that may be a mobile phone or computing watch. For example, a computing device configured as a mobile phone, or a wrist-worn watch or bracelet may be provided, where the mobile device, watch, or bracelet includes a display screen upon which a user interface of the system may be presented.

The interface may include a screen or viewer upon which one or more products or services offered for sale may be viewed, and/or a user dashboard may be presented, which dashboard, as disclosed herein, may display information about different retailers, different products, different geographical regions, serviced by the virtual marketplace within a designated geographical region, thereby allowing a user to shop virtually, and may include a mechanism by which the user may engage with the virtual marketplace, such as for the offering and purchasing of goods and services. More particularly, in various embodiments, the dashboard, displayable on a display screen of the client apparatus, tablet, phone or watch, may include a user engagement interface that allows the user to activate the microphone of the device, such as through tapping or otherwise activating the system, so as to receive a voice command from the user.

The voice command may be in natural language, and may be with reference to describing a product for sale or purchase in the virtual marketplace. Upon receiving a voice command, such as an order, the system, via the mobile computing device, may then transmit the voice command to a central server, such as to the A/I module of the system. The A/I module may be configured to include a voice recognition and/or modulation module that is capable of receiving and determining the meaning behind a user's voice commands, and may then initiate one or more routines within the system to effectuate the users command, such as with respect to effectuating and order and/or delivery thereof. The voice data may be received and/or entered into the system via a suitably configured application programming interface, API. Once received by the system, the command may be interpreted by the system, e.g., a speech recognition application, whereby the language will be parsed, and relevant data, e.g., product offering, ordering and/or delivery data, may be entered into the system. The system may then forward a confirmatory message back to the device of the user so as to allow the user to confirm that the system has correctly interpreted the voice command.

Where the user device is a phone, watch, bracelet, or the like, e.g., smart glasses, the device may be configured for communicating directly with the system, or may be configured for communicating with the system through an intermediary device, such as a mobile phone. For instance, the device, e.g., for ordering, may be "online" or "offline," and when the device is offline, a user may record and/or otherwise store data entries that may be transmitted or entered into the system when the device is online, such as when the device, e.g., watch, glasses, etc., is paired or synced with another device of the system, such as a mobile telephone, whereby the data, such as a verbal message, may then be transmitted to a server of the system.

Once received by the system, e.g., an A/I module thereof, the entered data may then be analyzed and evaluated, inventory may be uploaded and/or selected for fulfillment, a delivery means and a delivery route may be determined, and an order fulfilled. The results of the analysis may then be transmitted back to the recording device, which may be accompanied with one or more other system generated messages, which message may be an evaluation of the users use of the system, such as with respect to the goods they ordered and/or frequency of ordering, as well as delivery parameters, and/or merchants interacted with.

In various instances, additional user input may be received, analyzed, and may be transmitted directly to one or more social media platforms. For instance, the system, e.g., a client application thereof may allow for a user of the system to communicate, e.g., directly or indirectly, for instance, through a social media platform, with another user of the system, such as for evaluation, recommendation, advertising, etc. In particular instances, the user may authorize data to be input into the system for a variety of purposes, which data may be text data, email data, photo or other image data, metadata, and the like. In further instances, the data may be communicated by the user and/or their engagement with a social media platform, such as FACEBOOK®, TWITTER®, INSTAGRAM®, SNAPCHAT®, WHATSAPP®, and the like.

In some instances, the users engagement with the system, and/or each other as well as their performance with respect thereto may be monitored, tracked, and analyzed. As indicated the system can be configured for allowing various users of the system to communicate with each other. For instance, along with a commercial marketplace, providing a platform for users to buy and sell goods and/or services, the system may additionally be configured for providing a social market place, such as for allowing users to communicate with one another in a more social manner. Likewise, in various instances, the system can be configured for following users patterns of selling and/or buying and/or communicating with and through the system so as to recognize and/or identify trends, such as in a manner to make the commercial and social interactions more intuitive, easy, and useful.

For instance, in certain instances, the system may be configured for connecting various users of the system with growers, suppliers, deliverers, consumers, and those related and/or friends of the same, and for suggesting common relational attributes and/or suggestions of potential relational connections, so as to better make determinations of suggested purchases, e.g. products or services, suggested producers or retailers from whom to purchase, and/or potential shopping companions. Additionally, in certain instances, connections between those using the system, and family or friends not using the system may be made so as to provide suggestions to those not using the system so as to better cater to their consuming needs.

For example, the system may automatically determine the relationships between different users and their preferences and habits, e.g., with respect to their shopping and/or producing manners, and in turn the system can determine the same for each connection in the users social network to better determine patterns of behavior, such as with respect to a web-crawler, spider, robot, bot, or skimmer of the Artificial Intelligence Module, that is used to gather and/or harvest online information about users, which information may be employed by the system to make predictions, suggestions, and/or weight, and/or adjust potential usages of the system by the user with respect to the products they supply and/or purchase. This information may be gathered based on what physical or virtual, e.g., web, sites various users of the system visit, how they comment and/or interact with those sites and/or other users on those sites, messages they send, texts or images or other data they post, as well as the types of products they purchase and/or relationships they form thereon. This data may be collected by the system and may be fed into the A/I module, e.g., a machine learning platform, and may then be used as data points to form and/or structure a searchable database of the system.

In various instances, the user may allow the system to notify them when particular events occur, such as sales being posted or otherwise advertised, products being limited or offered in abundance, products that have expired, been consumed, and/or otherwise need to be re-ordered, and/or other pertinent information to their usage of the system. The user may also be notified when other users, e.g., those they follow, attend events with, and/or otherwise engage with, such as by shopping at their physical or virtual shop, e.g., a marketplace of the system, in which case, the user may be notified when other users posts about their shopping and/or producing activities. More particularly, once access to a user's social media platform(s) has been granted, the system may then be configured to automatically access these platforms, and mine them for data that may be useful to the system and its users, such as for determining products to supply, stock, and/or purchase.

For example, the system may analyze the various social media of the participants, with respect to their followers so as to determine relationships between the various users, such as from identifying common friends and connections, and/or the commentary thereof, posted on social media. Once set up and authorized the user may then select from the available merchants to purchase from. In this manner, when a user, such as a consumer posts about products used, needed, producers, or retailers, the system can flag these posts and use them to better configure the system, it's A/I module, and to provide for the needs and/or desires of the users of the system. Positive or negative posts may be propagated through the system, especially to users purchasing the same or similar goods, from the same or similar producers and/or retailers, so as to better evaluate system and/or user parameters, such messaging can be directed to authorized users of the system and/or to those in their social network, such as potential users of the system, in a manner such as this the system allows for leveraging each users social network.

Particularly, the more involved a user is in the system, the more likely they will be to post about their experiences on one or more social media platforms, thereby peaking the interest of others that may not presently be a user of the system, thus, motivating them to become a participant of the system. Hence, a useful implementation of the system, is promoting a social collaboration between users of the system, e.g., those producing products or rendering services, those purchasing products and/or services, as well as those delivering the products and/or rendering the services. For instance, accessible information may include various modes of social media, including FACEBOOK®, TWITTER®, INSTAGRAM®, FLICKER®, PINTEREST®, SNAPCHAT®, WHATSAPP®, and the like. Such media databases may be searched and mined for data that may then be fed into a separate database, such as a database associated with the system, which database may be populated with data from each of the users of the system, as described herein.

In this manner, all of the goods, e.g., products, and services provided for by a user of the system, as well as all of the producers, retailers, and consumers of the system, and their usage patterns may be collected and analyzed by the system so as to determine useful patterns to better assist the producing and consuming needs and/or patterns of its users. Once collected, the data may then be structured into a table or graph, or other relational infrastructure, such as a hash table or data tree or knowledge graph, which may then be used to identify correlations and/or relationships between the data, e.g., the producers, retailers, products, consumers, and/or deliverers of the system, such as with respect to the consuming needs of society.

Such relationships may then be weighted and mined to determine correlations between those shopping at a particular outlet, the products they are consuming, how they are rating those products, how often they are consuming those products, the frequency of purchase, as well as the brands purchased, from whom, and the like. This data may then be fed into an artificial intelligence engine of the system to determine and/or predict usage stocking and/or usage patterns. Additional information may also be collected and used to understand, evaluate, and characterize usage patterns, make predictions and suggestions, as well as determine trends on a larger market and regional basis, where this data may include an analysis of various social media, e.g., FACEBOOK®, postings of photos, comments, and/or likes or dislikes, what they post on the internet, and/or on another users or third party's webpage. This analysis allows for a great quantity of data to be collected and analyzed so as to derive one or more conclusions, such as a conclusion as related to producing and/or consuming.

For instance, as explained below, the A/I component may include an analytics engine that may be configured for performing both a learning function, such as through review of historic data, and to generate rules by which to determine supply and usage parameters and/or predict future production and/or consumption needs. For example, personal or public supply and usage data may be collected, monitored, and/or tracked, with respect to patterns of commerce, by a server and/or client computing device of the system, e.g., which may be a mobile phone. As indicated above, once collected, the data may be searched, and may be run through a suitably configured analytics module, such as an artificial intelligence engine, to identify producer and/or consumer information from various different sources that may be in some way correlated with one another, and therefore, may be used to predict patterns in producing and consuming on a regional and/or global basis.

Particularly, the data from all various sources may be collected and organized in a structure that is specifically designed to pinpoint correlations between otherwise unknown relationships. Such a relational architecture may take many forms, such as in the form of a Structured Query Language (SQL), Hierarchical Tree, or Knowledge Graph database. Collected information, for example, may be run through one or more computational and/or analytics regimes, as herein described, so as to identify pertinent known or inferred data points from which various relationships between producers, consumers, and delivery agents engaged with the system may be determined, and motifs in their usage may be explored, and future patterns predicted.

More particularly, typical data to be collected and analyzed may include products and/or crops to be produced, when to be produced to meet demand, price points, retailers producing goods or offering services, product characterizations, consumers purchasing the goods, characterizations of consumers, other products purchased, frequency of use, purchase, delivery times, delivery routes, and the like. Such data may be collected, pooled, weighted, and tallied, such as by undergoing one or more analytic protocols and/or processing by the artificial intelligence engine disclosed herein. From these analyses, corrected data, such as mean weighted or average supply, purchasing, and delivery data may be generated for the various users of the system, which data may then be fed back into the system and/or displayed on the various different client devices thereof.

Accordingly, in one aspect, presented herein is a system including an interactive, communication platform that is adaptable so as to provide for real-time producing and/or consuming needs that is constantly kept up to date, moment by moment, by a server network of the system. In particular embodiments, the platform may include one or more, e.g., a plurality, of client application programs, e.g., running on one or more client apparatuses, such as a client computer and/or mobile device, and a server system through which the client applications of the mobile devices may communicate with one another and/or the system. The system may also include one or more of an analytics module, for performing data analysis; and an artificial intelligence module, for generating a searchable data structure, e.g., a knowledge graph, through which data may be correlated, relationships determined or inferred, and future behaviors, e.g., consumption, may be predicted. Additionally, in certain instances, a targeted advertisement module may also be associated with and/or otherwise coupled to the analytics module, e.g., an inference and/or A/I engine, and associated media containing database, so as together to form a real-time advertisement generation mechanism, whereby one or more advertisements may be generated and transmitted to one or more users of the system, e.g., based on a user profile determined for them by the A/I system.

Accordingly, an important aspect of the system is an Artificial Intelligence (A/I) module having one or more of a learning or training platform, including a learning engine, and an analytics or inference platform, including an inference engine. In one instance, the learning platform includes a processing engine that is configured for taking known data, running a learning and/or training protocol on the data, and developing one or more organizing rules therefrom. Likewise, the analytics processing platform includes a processing, e.g., inference, engine that is configured for applying the rules developed by or for the learning platform and applying them to newly or previously acquired data to generate one or more outcomes thereby, such as where the outcome may be a known or inferred relationship, a known or predicted result, and/or a probability of one or more outcomes, and the like. In various instances, the inference engine is configured for continuously running analytics on received data on a daily basis and/or with regard to one or more special or promotional events, such as prior to, during, and/or after the event, e.g., a shopping event, and functions with the purpose of improving the efficacy of the event results, e.g., sales results, such as for the event itself and/or for one or more participants thereof, such as by improving the usefulness of producing, consuming, and/or delivery, of goods and services, being sold and purchased through the system.

As indicated above, in one particular embodiment, the A/I module is configured for determining correlations between the various data collected by the system. For instance, in various instances, the A/I module may be configured for generating a data structure, e.g., a knowledge graph, wherein the various data collected by the system, e.g., suppliers, retailers, products for sales, etc., are uploaded into the graph as a constellation of data points. In such an instance, the learning engine may be configured for taking known rules to determine known relationships between the known data points, and from these known data, the learning engine may be configured for inferring unknown relationships between data points to determine heretofore unknown relationships between the data points, which in turn may be used to determine new rules by which to determine other unknown data points, relationships between the two, and/or to make one or more predictive outcomes, e.g., projected sales or trends, based on the known and/or learned data, such as in response to one or more queries.

For example, the data, the relationships between the data, and the determined and/or inferred rules may be employed to generate a data structure, such as a knowledge graph, and/or to mine the various data within the system to generate an answer to a query. Accordingly, a unique feature of the A/I module is its predictive functionality, which functionality may be implemented by a predictive analytics platform that is configured for performing one or more predictive analyses on the obtained and/or generated data, such as by generating one or more predictive outcomes. For instance, a predictive outcome may be in response to a query as to sales and/or shopping trends within the system, users of the system, and/or with respect to one or more inter-relations therein.

Accordingly, in one aspect of the disclosure, an artificial intelligence module (A/I) may be included in the system. For instance, the various devices and systems, as well as their methods of use, as disclosed herein may be employed so as to evaluate different elements of commerce, selling, purchasing, and the like. More particularly, the system may be configured for determining patterns in the behaviors of the various people using the system, e.g., producers and shoppers, from which patterns various relationships may be determined, and one or more actions may be taken by the system in view of the identified relationships and/or determined patterns. For example, once a relationship between the various producers and/or consumers acting upon the system is identified, such as with respect to how certain producers interact with certain products they offer for sale, and a pattern with respect to how the consumer is behaving with respect to their relationship to the producers is determined, the system may take one or more actions, e.g., suggestive measures, to account for that relationship and/or activities of the users.

Specifically, the user's engagement with the system may form regular interactions and/or patterns that may be recorded and tracked within the system, from which patterns the machine learning and/or analytics module of the system may be employed to learn each user's particular pattern(s) of behavior, and determine a range of freedom behind those actions and/or predict future courses of action and outcomes. This is useful when by the user's pattern of engagement with the system appears to coincide or conflict with the patterns of usage of other users of the system. More specifically, determining patterns of usage of the system is useful when determining products to be promoted, prices to be charged for those products, sales to be run, and the like, as well as to predict future trends with respect thereto. Particularly, the system may be configured for not only determining the presence of various factors influencing behavior, such as the presence of collective sales and/or bargaining, but as well for determining which factors, e.g., social, environmental, supply, and demand factors, which may be leading to that influencing, and to what degree.

Further, once determined, the system, e.g., via the suitably configured learning platform, may then be adapted to correct for such influences, such as by the artificial intelligence module increasing or decreasing a weighting scale used to weight the connections between various influencing factors and user actions and/or outcomes of those actions. For instance, in such instances, when various patterns are formed, the system may learn these patterns, determine the presence of one or more trends, or other factors of import, and/or predict a likely manner in which the user will behave, and the level of confidence may be given to the predicted outcome, such as from 0.0, not very likely to 1.0 almost completely certain. Accordingly, when the system makes a correct prediction, the connection between the initiating action and the presence of a trend in that action, as well as the connection between the action and a predicted outcome of that action, may be strengthened, such as by giving an estimation of the presence of a trend and/or a predicted outcome in the future, for the same or substantially similar circumstances, more weight.

Likewise, when a pattern is broken, less weight may be given to the connection between the initiating action and the presence of a trend and/or predicted outcome, until the old pattern is re-established and/or until a new pattern is formed. These changes in patterns can also be aggregated along various dimensions to group a plurality of users together, and/or in the contrary, a group of people interacting with the system together, such as in a coalition, may be used to more precisely define and weight patterns of engagement. In a manner such as this, the system may be configured to keep track of the various users of the system as well as their individual and/or group patterns of behavior, so that the various identified factors that may be influencing the emergence and/or maintenance of such patterns may be identified, predicted, and employed for a plurality of different uses, such as for determining the presence and/or degree of trends behind one or more user's engagement with the system, and/or for taking responsive actions, such as to predict future needs and/or usages.

Specifically, the system may generate and employ one or more data structures that may be queried so as to predict the answer to one or more questions. For instance, as described in detail herein, the system may be configured for receiving information with regard to a plurality of users, which information may include purchasing data, identifying information, social circle information, as well as social media engagement information. Likewise, the system may present one or more users to a series of questions, such as via an automated interview process, the responses to which may be used to characterize the user. Additionally, the system may track how the user engages with the system, as well as the attendant data pertaining thereto, such as time, place, preferred retailers, number and types of product purchased, preferred delivery methods and times of day, length of time of delivery, who he or she messages or otherwise interacts with through the system platform, who they follow, what events they engage in, and the like. All of this information may form data points that characterize any given user and/or their selling and/or purchasing through use of the system. These data points may then be employed as branches or nodes within a data structure, which data structure may take any suitable form, such as a data tree and/or a knowledge graph. From these various data points relationships between users of the system may be identified, and the connections between them may be weighted based on the number and form of the interactions between them. Hence, the more users interact with one another in a positive manner, the greater the weighting will be between the various nodes that may be employed to define their interaction. Likewise, the more negatively the users interact with one another, the less (or more negative) weight will be given to define their interactions. In similar manner, the more the user's interactions with the system comport with one or more groups of the system, e.g., model groups, the more weight those various connections will be given, and the more the user's interactions do not comport with one or more model groups, the less weight those connections will be given.

Likewise, in various instances, a user may make a prediction as to an outcome that actually occurs, and in other instances, the predicted outcome does not occur, in such instances, more or less weight will be given to the user when predicting outcomes for future events, based on this successful prediction of outcomes of past events. Hence, where it is determined that various, e.g., external, factors are in some way influencing a user's interaction with the system, such as with respect to the buying and selling of goods, the system may be configured for identifying and recognizing trends in behavior, such as with respect to producing and purchasing goods. Where identified factors are determined to be affecting a one or more users' engagement with the system, such users may be grouped together by the system, such as based on the type of factors by which their use of the system is being influenced, and in such instances, their engagement in the system may be treated as a block and/or corrected for as a block, such as by giving the block's engagement with the system less weight. Likewise, those whose use of the system are determined to be free of influencing factors, e.g., model users, may also be grouped by the system, and their engagement of the system may be given more weight.

Accordingly, in a manner such as this, data points between the various branches or nodes in the data structure of the system may be used to generate correlations between the nodes and to weight those correlations so as to build a data structure thereby, such as a knowledge tree or graph, which may then be queried to determine other relationships not previously known and/or to predict the influence of external factors affecting the usage of the system, and/or to predict and weight potential outcomes based on a collective of usage patterns of how users are engaging with the system. For instance, a data structure, such as a relational or hierarchical or knowledge graph structure, may be generated by the system receiving known data about the various users of the system, e.g., producers or sellers, purchasers of goods, promotional event organizers, or other users of the system, and, via a suitably configured data management system, building a structure, e.g., a tree or constellation, of data points and drawing connections between the data points.

As indicated above, this data may be collected in a variety of ways, such as by the system tracking products produced, offered for sale, and by who, prices at which offered and sold, products purchased, and by who, delivery routes and times, experiences recorded by users in the commerce process, and the like. Such information may be tracked by actual usage of the system, as well as commentary related to the system and/or its users, with respect to their postings online, such as via social media engagement. Hence, in some instances, system usage and/or user preferences and/or experiences may be determined by generated interviews of the users, system instigated accessing and review of user online or social media usage, e.g., web-crawling and/or mining social media data with respect to products sold or purchased, as well as other user usage of the system and/or internet, such as through postings of texts, photos, blogs, comments, searches performed, time spent on producer or retailer web-pages, and other associated metadata through which a user produces a presence on the global internet, all of which data may then form various branches or nodes of the data structure, e.g., graph.

For example, the data to be entered into the database, may be used to structure and populate an inference engine, e.g., based on the graph, which engine may be employed for searching and/or otherwise performing queries, and may further be utilized by an artificial intelligence analytics engine, as explained below, for predicting outcomes. Consequently, user and/or performer data may be obtained and entered into the system in a variety of different manners, and may include the storing of information in hierarchical or relational models, as well as in a resource description framework (RDF) file or graph, and the like, as described below. Such a procedure may be performed for a number of different users.

Once the system users have been identified, characterized, and entered into the system, the users, as discussed above, may be grouped in accordance with one or more system usage parameters, and known relationships may be determined between the various users in the group. In particular, once the database is set up, the data collected and entered into the system, the database may then be structured, such as for being queried or otherwise searched, such as with respect to the existence of various relationships between data points. For instance, the number of relationships between the various users as well as the strength of those correlations may then be determined and used to weight the known or fact based relationships. Likewise, from these known fact based relationships, previously unknown, inferred relationships may be determined, and weighted. In a manner such as this, a data structure, such as a knowledge graph, or other data structure may be generated so as to include both known and unknown, inferred, relationships.

Accordingly, once generated, the data structure, e.g., knowledge graph, may then be queried along a number of lines so as to make one or more determinations with respect to the various relationships between the various branches or nodes of the graph. For instance, the system may be configured to automatically be queried to determine if there is a pattern by which one or more users are interacting with the system. For example, if one or more otherwise unrelated users appear to be engaging with the system in a like manner, e.g., their selling or purchasing activities appears to be relatively the same, the system may flag their behavior for further analysis, a deeper dive into any possible relationship between the two users may be initiated, a source of their possible correlation may be determined, and from the strength of that relationship between the two users, a score may be given so as to weight the possibility the users may be acting in a collective manner. Hence, in various embodiments, the system may be configured so as to be queried along a number of different parameters to determine and weight a number of different answers, and thereby make a variety of different predictions. These predictions may then be given a weighted score, such as to the probability of being correct, and based on that score, the system can self-correct so as to properly account and/or correct for the predicted behavior of its users, such as with respect to commercial interactions being engaged in.

In a typical architecture for performing such functions, such as for performing a structured search query, for instance, the system may include a database. The database may include information pertaining to the various producers, suppliers, retailers, products being offered, prices, and purchasers of the products, and/or delivery mechanisms of the system. The database may also include characteristic data pertaining to the user themselves, relational data pertaining to one group of users in relation to other users of the system, e.g., with respect to characteristic data pertaining to how the users have interacted with the system in the past, e.g., including any pattern data, as well as predictive outcome data of the past, present, and/or future, and may include other characteristic data the system determines is relevant to the particular question being queried. In such an instance, the relevant data points may be identified and pulled from the general database, and a localized or global data structure may be built.

Any data structure may be employed for performing the search in question, in various instances, however, the data structure may be a relational data structure, such as a Structured Query Language (SQL) database, which may be implemented via a relational database management system, or the data structure may be a hierarchical, or graph based data structure. For instance, in one implementation, a SQL database is presented, which database may be a table based data structure, such as where one or more tables form the base structure wherein data may be organized and stored, such as in a variety of columns and rows, searched, relations determined, and queries answered in a structured manner. Particularly, in such an instance, SQL statements may be used to structure, update, and search the database.

In various embodiments, a table-based database may be presented, e.g., a relational database structure, which data structure may be searched, and used to determine relationships from which answers to one or more queries may be determined. Typically, in such a data structure, identifiers, such as keys, are used to relate data in one table to that in another table. Accordingly, provided herein is a database that may be built and structured as a structured query language (SQL) database that has a relational architecture, and may be managed by a data management system, such as a relational database management system (RDBMS). In particular instances, a series of tables, for instance, may be employed by which correlations may be made in an iterative fashion.

Specifically, with respect to whether a certain user of the system is engaging with the system, such as with respect to a particular product being offered and sold and/or by whom, a first correlation may be made with respect to the subject's normal interactions with the system, as determined over a series of events, such as how well the user's interactions correspond with the median, mean or average of users overall, and a first table may be formed to record this data as a first use model sample set. Then, a second table may be built whereby the user's current use of the system with respect to a current present event and/or participant in the event is tracked and compared against the collective of current users, and the two tables can be compared with one another so as to determine if the user's present interactions comport with their past use of the system, such as with respect to how their present use comports against the collective, and predictions about future usage and/or relationships may be predicted and/or inferred.

Where it is determined that a user's present use is outside of what would be their historical or predicted usage average, the system could flag the interaction as worthy of a deeper dive, and if necessary can begin to look for other correlations between this user and their activity so as to determine possible explanations as to why this user's present interactions our outside of their predicted behavior. Specifically, where the data structure is a series of tables, the user's identifier or key may be searched and compared through a number of tables for a wide variety of correlations that may be determinative in explaining their present, aberrant interactions, and the system may suggest corrective measures to re-engage the system and its other users, such as for the purpose of one retailer to regain a prior customer, such as by the system automatically generating a special sale for that user, based on their determined user preferences.

Accordingly, a key may be used to correlate the tables, which key may be accessed in response to a question, prompt, or command, such as why the user's present use does not comport with their past use of the system, or the use of the system by the average user. The key may be any common identifier, such as a name, a number, e.g., a RFID number, cellular identification number, a phone number, and the like, by which one or more of the tables may be accessed, correlated, and/or a question answered. Accordingly, without the key it becomes more difficult to build correlations between the information in one table with that of another. In certain instances, the table may be a hash table and a hash function may be employed in search the table for correlations with other data structures.

As indicated, a further architecture that may be used to structure a database is a hierarchical data structure. For instance, in various instances, the database may be structured as a data tree, e.g., a suffix or prefix tree, where various data elements may be stored in a compressed, but in correlated fashion, where the various roots and branches form divergent data points with respect to potential correlations.

Specifically, in such an instance, the data may be stored within the data structure in such a manner that the stored records are connected with one another through relational links, such as where the various records are a collection of fields that store data files in a chain of superior and subordinate levels of organization, such as in a pyramidal or other hierarchical configuration.

In other instances, a graph-based architecture may be structured and used to determine the results for one or more queries. Particularly, a knowledge graph architecture may be employed to structure the database; so as to enhance the performance of computational analyses executed using that database. Such analyses may be employed so as to determine whether a given user's present use of the system comports with their past use and/or comports with how other users in general, e.g. the average user, have or are presently interacting with the system, such as with respect to the present user's scoring of a given event and/or performer in the event, and/or with respect to their regular pattern of usage.

Accordingly, the sophisticated algorithms employed herein, are adapted for structuring the infrastructure of a relational database so as to enable more efficient and accurate searching of that database such as via performing graph based analyses, as well as for performing table or tree based analyses. For instance, where a user of the system, e.g., a consumer, is purchasing a product from another user of the system, e.g., a producer or retailer, a data structure may be generated where the first user's characteristic data are used as a first collection of data points, and the characteristic data of a second user, e.g. the retailer, may be used as a second collection of data points, and relationships between the first and second users may be determined through use of one of more data structures, e.g., knowledge graphs, tables, e.g., hash tables, pre-/suffix-tress, etc. as described herein. Additionally, a third collection of data points may include how the collective of present or past users are engaging with the system, e.g., with respect to one or more of these users, such as with respect to the users use of the system.

Hence, in view of the above, the present system allows decentralized user to access and shop at, and therefore, gain the benefits of a centralized marketplace. Specifically, in one embodiment, the system herein provides a centralized database that allows for collective database and inventory mapping. In such an instance, all producers, all stores, all products and inventory, all prices, and all methods of delivery may be mapped to a central source database, whereby all the commercial activities taking place within the system may be presented, monitored, tracked, and accounted for. For instance, all merchants and their inventory may be resented, and their point of sale interactions may be mapped, e.g., to centralized database, and the transactions they transact can be followed, and the delivery of those products to the purchasing consumer can be effectuated.

In a manner such as this all inventory and purchased goods can be monitored and tracked throughout the system. Specifically, in various instances, the goods being tracked within the system, as well as all the various data associated with the goods may be tracked by any suitable tracking system, but in some instances, may be tracked by a suitably configured block-chain mechanism. An additional feature of the system is that it provides a more personalized shopping experience for the consumer and retailer. For instance, the system may track purchasing habits of a consumer, may track their health and/or dietary needs, and/or may track prices throughout the system and make suggestions to the consumer based on products that better fit their dietary habits, health needs, and/or price budget. For example, the system may analyze all relevant information regarding the consumer and his or her needs, and can make purchasing suggestions and/or advertising, e.g., discount coupons, such as for products, frequently purchased, or as substitutes for products that the consumer cannot consume, for any of a number of reasons, such as based on food allergies, medical conditions, or selected diets, such as Atkins, Keto, Paleo, etc.

Additionally, as discussed above the system may interface with one or more mobile apps on the users phone, and use that data to better discern the consumers dietary and/or purchasing needs, and provide suggestions based on the collected and analyzed data. Such recommendations may be made to consumers based on intensity and degree of working out, type of work outs, frequency of workouts, and may automatically determine where the consumer is and provide them with suggestions of where to shop based on needs, pricing, geographical region, and the like.

A further feature of the system is that it may interact with smart appliances to determine shopping needs, e.g., a smart refrigerator may connect and communicate directly to the system and/or to a system app running on the consumers phone and notify the user of products running out, products needed, and/or of potential food allergies or contraindications with respect to products purchased. For instance, the system may track contents of refrigerator, or other smart appliance, and alert to dietary instructions, track usage, order new/replacement items, and the like. The system can also provide reminders, suggestions, a dietary evaluation, and/or may provide for automatic ordering and delivery of products, based on entered or determined needs, and further based on entered and/or determined parameters for such. A determined timing for all of this may also be provided and tracked by the system, such as based on the predicted usage or need of the consumer.

In a manner such as this, a more personalized shopping experience may be provided for the consumer, whereby the system may automatically generate a shopping list for the consumer, automatically determine the best prices and suppliers or retailers from which the purchase the products, using the credit card or electronic currency of the user purchase the goods, and arrange for the delivery of the goods purchased all automatically without the intervention of the consumer. Alternatively, the system may generate recommendations that can be presented at the user interface and allow the consumer to approve or disapprove of the recommendations of the system, before implementing its automatic shopping protocols. Hence, in this manner, the system may automatically map out the consumer needs taking into account their particular sensitivities and/or preferences, so as to provide a customized shopping experience and to facilitate shopping/delivery to a user based on their individual needs.

Additionally, for the delivery facility, the system can provide for the best route, best timing, best gas prices, management, and overall ensure the most efficient delivery process, such as accounting for all consumers making purchases and needing delivery at similar timing. Further, as indicated, the system provides for the easy integration of smart delivery mechanisms that includes automated, e.g., robotic, assembly and/or packaging, automated car and/or drone delivery, and the like, so as to provide a substantially autonomous and automated producing, retailing, purchasing, and/or delivery system. Of course, all of this can also be provided to the various producers and retailers of the system so as to give them a better understanding of what products to produce and/or stock for sale, and/or for pricing of the same, so as to be more competitive within the market place. Specifically, the system can track retailer or producer products being offered for sale, track purchasing trends over the system, and provide pricing or marketing suggestions as well as growing recommendations for producers based on local and/or global demand, costs of goods, and/or environmental data received or mined by the system, which may include a database search of the farmers or historical climate almanac, as well as current commodities or resource pricing on a relevant stock exchange.

Another advantage of the system allows for a more social market place whereby consumers and retailers can more easily communicate directly with each other, using the system, or indirectly, such as automatically posting via one or more social media platforms, thereby providing a more immediate commercial and/or social feedback loop. Particularly, after an order is made and the product is delivered to the user, an immediate feedback loop is initiated, whereby the consumer is invited to directly respond to and evaluate the shop, producer, and delivery provider, which evaluation may be sent directly to the shop, and/or may be posted directly to a social media outlet, and then the merchant is given the opportunity to respond, thereby opening up a direct dialogue between consumer and shop. In a manner such as this, the system provides for a social environment tying the consumer more tightly to the retailers and/or other consumers in a more social environment, such as via an app of the system.

With respect to monitoring and tracking inventory, goods in transit, and transactions taking place within a system, such as a system of commerce, or other record keeping, such as with respect to a person's shopping records, data (e.g., inventory and/or shopping data) may be grouped and/or stored within a plurality of formats. One such format is termed blockchain, Block chain is a manner of securely storing data in blocks, which blocks are unalterable and secured using cryptography, such as where each block typically includes a cryptographic hash of the previous block, a time stamp, and a characterization of the transaction and data pertinent thereto. In essence, blockchain is an open, distributed ledger for the recording of transactions between parties, which ledger is both verifiable and permanent. Specifically, once recorded, the data in any given block cannot be altered retroactively, or at least without the alteration of all subsequent blocks, which is impractical at best.

A unique feature of blockchain is that it is typically managed autonomously by a peer-to-peer network that is adhering to a protocol for inter-node communication, such as with respect to the validation of new blocks being disposed within the chain. In a manner such as this, blockchain-based exchange can be transacted safely, cheaply, and more securely than other traditional storing and/or securing systems, allowing the transaction to be completed more efficiently. Specifically, blockchain sets up transactional, title rights that are detailed in the block thereby providing a secure record of the exchange. In essence, every block in the chain forms a node in a decentralized system, where every node has a copy of the blockchain. The quality of the data and its security are maintained by massive database replication and computational, collective trust.

More specifically, each block stores a batch of transactions that are hashed, encoded, and stored in one or more formats, such as in a hash table or tree or knowledge, as set forth above. Hence, whenever a new block is to be added to the chain, a designated peer, e.g., designated via cryptomining, receives a high-scoring version of the chain, e.g., an old version of the chain with a single new block added, the peer extends or overwrites their own database and retransmit the improvement to their peers in the chain. Particularly, mining nodes validate transactions, add them to the block they are building, and then broadcast the completed block to other relevant nodes in the system. Consequently, blockchains are typically built one on top of the other in a manner so that new blocks are scored as the new blocks are added onto old blocks, where incentives are offered to work only on extending the chain with new blocks rather than overwriting old blocks, and in this manner the probability of an entry becoming superseded goes down exponentially as more blocks are built on top of it.

Another feature of the blockchain system as implemented herein is a timestamp setting forth the various times of transactions taking place and being recorded in the block, as well as the time during reach the block will be open until a new block is added to the chain. For instance, in various instances, the block time is recorded and constitutes the average time it takes for the network to generate one extra block in the blockchain. The blocktime can be set or determined by the system, but typically a new block may be created every few, e.g., five, seconds, where by the time of block completion, the included data becomes verifiable. A shorter block completion time means a faster transaction time.

A further feature of the blockchain system herein is its decentralization. For instance, by storing data across its peer-to-peer network, the blockchain eliminates a number of risks that come with data being held centrally. For instance, the decentralized blockchain uses ad-hoc message passing and/or distributed networking. Particularly, because of the decentralized nature of the peer-to-peer blockchain network, it lacks centralized points of vulnerability that hackers can exploit. Likewise, it has no central point of failure. Additionally, blockchain security methods include the use of public-key cryptography. For example, a public key having a long, random string of numbers, forms an address on the blockchain, which can only be accessed by the key. Value tokens, therefore will then be sent across the network and be recorded as belonging to that address. Alternatively, a private key may be used to secure the chain. A private key is similar to a password that gives its owner access to their digital assets or the means to otherwise interact with the various capabilities that the blockchain support. Hence, such data stored on the blockchain is virtually incorruptible.

Specifically, as indicated, every node in the decentralized system has a copy of the blockchain where the quality and the security are maintained by being replicated throughout the peers in the chain. Hence, because of the decentralized, replicable nature of the blockchain storage, there is no centralized or "official" copy of the ledger that exists, thus, no single user's copy is "trusted" more than any other, and transactions are broadcast to all relevant nodes in the network, such as by the system programming. Accordingly, blockchain is a consensus system of performing transactions and record keeping of the same, which follow certain given rules as to how the blockchain is supposed to operate so as to secure the authenticity of the transactions they record. These rules are propagated within every block in the growing chain, where the rules of one block are continued in the second block, so as to ensure the consistency of the chain.

These rules determine how and when a new block will be generated in the chain, and how the records are to be recorded therein. Hence, these transactions are recorded in historic blocks of records that are stored in a chain by following the same rules, where the chain is stored on a chain of peer-to-peer servers. One or more of data being stored in the block, as well as the structure of the chain, especially with respect to the rules to be followed by the system in creating blocks in the chain, may all be determined and secured via an appropriately structured hash function, such as where blocks and records are accessed via a randomly generated string of numbers having a good proportion of bits that are dedicated to the requirements for accessing data and/or generating a new block in the chain. Hence, it is the accordance with the determined rules that provides validation for any given transaction and/or any given block in the chain, such as where the authenticity of validation is agreed upon by consensus of the historic peer block records. This, therefore, prevents counterfeits from being instigated without changing all the records within the block.

Accordingly access to a given block and/or the generation of a new block is determined by the performance of a hash function where the leading series of bits may all be zeros making the chance of breaking the code infinitely difficult without the designated key. Another security feature is the way the next peer in the chain is added to the block chain so as to propagate the next block in the chain. Specifically, providing processing power so as to generate the next key is presently used for generating the next block, where it is unknown as to which peer based computer will be the one to derive the next key, and thus become the one that generates the next block in the chain. This is a process currently termed cryptomining, where the peer computer generating the next block in the chain gets paid for doing so.

Hence, there are a lot of copies of portions of the block chain, stored on distributed computers in a peer network. As such no particular peer computer would typically have a complete copy of the entire block, especially, in view that a block is only open for the recording of transactions for a limited time, and once that time has elapsed, the block is closed, and a new block mined and opened. Further, as the system itself determines the time period during which a block is open, there is no way to predict how many transactions any given block will encode, which can be seconds, minutes, days, and the like, dependent on the parameters set by the organizing rules, basically based on the velocity of transactions being performed. Also to be noted, in certain instances, where the records being processed require a huge amount of processing power, several different peer computers can be performing the processing for the block.

A further feature of various different blockchain systems is the ability to perform various different blockchain interactions through which different applications can be performed with respect thereto. In various instances, for a given system, a new, unique blockchain may be formed, or a new use of an existing blockchain may be formulated as a subset of the existing blockchain. In particular instances, the block chain may be associated with a cryptocurrency, an existing or new cryptocurrency, for the purpose of effectuating monetary transactions. Hence, for the purposes of the present disclosure, a new blockchain may be formed with a new or existing cryptocurrency, or an already existing blockchain may be accessed by the generation of a blockchain application for accessing a new block in the chain wherein new transactions, such as those disclosed herein above, may be imitated, recorded, and transmitted, so as to become a part of the block chain. In such an instance where the blockchain being utilized with a cryptocurrency, crypto-transactions may also be implemented within the system.

Consequently, in various embodiments, certain blockchain iterations allow for the incorporation of future programming into the existing rules so as to add new features to the existent blockchain. In a manner such as this the present system may be associated with an already existent blockchain and/or utilize an already existent cryptocurrency where by transaction records of the system may be stored and cryptocurrency transactions carried out, which new rules and records will then be propagated in all other newly generated blocks in the chain. In manners such as these, the transactions and records thereof, as recited in the present disclosure, may be implemented in conjunction with one or more of a blockchain and/or cryptocurrency.

For instance, in various embodiments, the system may be associated with a BITCOIN® type cryptocurrency, or ETHERIUM®, or any other form of blockchain and/or cryptocurrency. ETHERIUM®, in some instances, may be a particularly good type of blockchain architecture, protocol, and cryptocurrency for association with the present devices and systems as well as their methods of use. Specifically, an application to track and record the interactions herein can be set as one or more rules within the ETHERIUM® protocol and, thus, may become part of that blockchain architecture and its rules. More specifically, in various embodiments, machine language, e.g., programming, in accordance with the present disclosures may be provided to the ETHERIUM® blockchain space, which code can be associated with the endogenous programming therein, and become part of the ETHERIUM® protocol and rules.

Particularly, the programming can be configured as an automated account or sub-account so as to track the activities of an authorized subset of users, such as with respect to the performance of commercial transactions as disclosed herein above. More particularly, within such an automated account, the rules of the subsystem may be structured, which rules can be defined to control the various operations of the system, and they may be carried out as sub-routines. Hence, in this manner, accounts and sub-accounts may be formed, control may be given to the account holders, transactions performed, and their records stored and maintained, e.g., in ledger format, in accordance with the methods discloses herein, such as in a blockchain architecture run, in part, on a server of the disclosure. Of course, in various instances, the cryptocurrency, such as ETHER®, can be used to provide the currency of various transactions of the system, including for paying the cost for setting up the accounts in the first place.

The contents of the articles, patents, and patent applications, and all other documents and electronically available information mentioned or cited herein, are hereby incorporated by reference in their entirety to the same extent as if each individual publication was specifically and individually indicated to be incorporated by reference. Applicants reserve the right to physically incorporate into this application any and all materials and information from any such articles, patents, patent applications, or other physical and electronic documents.

The methods illustratively described herein may suitably be practiced in the absence of any element or elements, limitation or limitations, not specifically disclosed herein. Thus, for example, the terms "comprising", "including," "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof. It is recognized that various modifications are possible within the scope of the invention claimed. Thus, it should be understood that although the present invention has been specifically disclosed by preferred embodiments and optional features, modification and variation of the invention embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the methods. This includes the generic description of the methods with a proviso or negative limitation removing any subject matter from the genus, regardless of whether or not the excised material is specifically recited herein.

Other embodiments are within the following claims. In addition, where features or aspects of the methods are described in terms of Markush groups, those skilled in the art will recognize that the invention is also thereby described in terms of any individual member or subgroup of members of the Markush group.

That which is claimed is:

1. An online craft and artisanal marketplace system for selling and delivering items, the online craft and artisanal marketplace system comprising:
   a structured database, the structured database storing goods data corresponding with a plurality of locally sourced physical items for sale from a collective of small, local goods producers, the collective of small, local goods producers including a plurality of community based goods producers, the goods data including information regarding availability of the one or more locally sourced physical items for sale and information about each of the community based goods producers who are offering those locally sourced physical items for sale;
   a server coupled to the structured database and configured for communicating with a plurality of client computing devices over a network interface, the server further being configured for generating a graphical user interface at a display of a set of first client computing devices, the graphical user interface for producing at the display a shopping dashboard for presenting the plurality of locally sourced physical items for sale and the collective of small, local goods producers offering those locally sourced physical items for sale, the server comprising:
      a first processing engine for receiving at least first order data corresponding to one or more user selections, the user selection comprising a selection by at least one user, of at least one physical item of the locally sourced physical items for sale presented at the shopping dashboard and a community based goods producer preference for each physical item selected by the one or more users;
      a second processing engine for comparing the first order data with the goods data in the database so as to ensure that each user selected physical item from each preferred community based goods producer has not been allocated for another order;
      a third processing engine for generating merchant purchase data for each selected community based goods producer of each selected physical item to be purchased by the one or more users, the merchant purchase data indicating that the one or more users has selected a physical item to be purchased and has selected a community based producer from whom to purchase the physical item;
      a fourth processing engine for transmitting to a client computing device of each selected community based good producer the merchant purchase data, the merchant purchase data further indicating that a selected physical item from the selected community based goods producer should be packaged for pick up and delivery;
      a fifth processing engine for receiving packaged good data from each client computing device of each selected community based good producer, the packaged good data notifying the server that each selected physical item to be purchased from each respective community based good producer is ready for pick up and delivery;
      a sixth processing engine for receiving the packaged good data, generating geolocation data, and further for generating delivery route data, the geolocation data including a geographical location for each user selected community based good producer, a geographical location for the one or more users, and the delivery route data including a delivery route defining a route to and from each community based good producer ending at a geographical location of the one or more users, the delivery route data further comprising a predicted time calculation for a duration of travel along the delivery route;
      a seventh processing engine for receiving and assessing the geolocation data and the delivery route date, for determining progress along the delivery route, and for notifying the server of the approximate time that a selected purchased physical item should be delivered;
      an eighth processing engine for receiving a notification that each purchased physical item has been packaged and picked up for delivery; and
      a ninth processing engine for receiving a notification that one or more packaged physical items was delivered to each of the one or more users.

2. The online craft and artisanal marketplace system in accordance with claim 1, wherein the at least first order data includes at least first and second order data from a plurality of different users having different geographical locations, and the delivery route data comprises a delivery route that includes each of the geographical locations of each of the different users.

3. The online craft and artisanal marketplace system in accordance with claim 2, wherein the selected community based goods producer comprise a plurality of different community based goods producers having different geographical locations, and the delivery route data comprises a delivery route that includes each of the geographical locations of each of the different community based goods producers.

4. The online craft and artisanal marketplace system in accordance with claim 3, wherein the predicted time calculation includes a prediction of a delivery time for at least the first order and the second order, and the notification includes data including the actual time of delivery for the first order and the second order.

5. The online craft and artisanal marketplace system in accordance with claim 4, wherein the server comprises a first further processing engine for comparing the prediction of the delivery time for at least the first order and the second order with the actual time of delivery for the first order and the second order.

6. The online craft and artisanal marketplace system in accordance with claim 5, wherein when there is a difference between one or more predicted delivery times of the first and second orders and one or more actual delivery times, an additional processing engine may be employed to perform a first analysis to determine a reason for the difference so as to produce first analysis result data.

7. The online craft and artisanal marketplace system in accordance with claim 6, wherein the performance of the first analysis involves analyzing one or more weighted factors employed in making the prediction of the delivery time for the at least first order and second order.

8. The online craft and artisanal marketplace system in accordance with claim 7, wherein the server comprises a second further processing engine for employing the first analysis results data to re-weight at least one of the one or more weighted factors.

9. A method for delivering locally sourced goods ordered by a consumer via an online craft and artisanal marketplace, the locally sourced goods including one or more physical items proffered for sale by a community based goods producer, the method comprising:

providing, from a server computer, at a display of at least a first client computing device, a graphical user interface, the graphical user interface for producing, at the display, a shopping dashboard for presenting one or more locally sourced physical items for sale and a collective of small, local goods producers offering those locally sourced physical items for sale;

receiving at the server computer, from the first client computing device over a network interface, first digital order data for a first online order of goods, the first digital order data including a selection from at least a first consumer of at least one physical item to be provided by at least one selected community based goods producer, and storing the first digital order data in a database in communication with the server computer;

transmitting, from the server computer to a set of second client computers via the network interface, in response to receipt of the first online order of goods, at least a portion of the first digital order data, the set of second client computers comprising at least one community based goods producer client computing device that is configured for receiving digital order data and for transmitting one or more of physical item availability data, order receipt data, and order complete data back to the server computer;

receiving, at the server computer, from the at least one community based goods producer client computing device, a notification, the notification including one or more of physical item availability data, order receipt data, and order complete data, the order complete data corresponding with the first digital order data of the first online order of goods, and indicating when the at least one selected physical item is packaged and ready for pickup and delivery;

determining, by the server computer, in response to receipt of at least the first digital order data of the first online order of goods from the first consumer, a geolocation for each selected community based goods producer having transmitted an order complete notification to the server computer as well as a geolocation for the first consumer so as to produce determined location data;

generating, by the server computer, using the determined location data, pick up route data, the pick up route data setting forth a route by which to pick up each selected physical item corresponding to at least the first online order of goods that is ready for pick up from each respective community based goods seller having transmitted an order complete notification to the server computer, the pick up route data including delivery data comprising the geolocation of at least the first consumer;

transmitting, from the server computer to a set of third client computers via the network interface, the pick up route data, the set of third client computers including at least one delivery service client computing device that is configured for generating and transmitting a first notification indicating when one or more selected physical items corresponding to at least the first online order of goods has been picked up from a respective community based goods seller, and a second notification indicating when the one or more selected physical items has been delivered to at least the first consumer;

receiving, at the server computer, at least a first notification that one or more selected physical items associated with at least the first online order was picked up for delivery; and receiving, at the server computer, at least a second notification that one or more selected physical items associated with at least the first online order of goods was delivered.

10. The method for delivering locally sourced goods according to claim 9, wherein the method further comprises receiving at the server computer over the network interface, from a second client computing device, second digital order data for a second online order of goods, the second digital order data including a selection from at least a second consumer of at least one physical item to be provided by at least one selected community based goods producer, and storing the second digital order data in the database.

11. The method for delivering locally sourced goods according to claim 10, wherein the determining further comprises determining a geolocation for the second consumer as well as determining each selected community based goods producer corresponding to each of the first and second online order of goods.

12. The method for delivering locally sourced goods according to claim 11, wherein the delivery data of the pickup route data further comprises the geolocation of the second consumer.

13. The method for delivering locally sourced goods according to claim 12, wherein the first notification comprises a plurality of first notifications including a first pickup notification indicating that one or more physical items associated with the first online order was picked up for delivery to the first consumer, and a second pickup notification indicating that one or more physical items associated with the second online order was picked up for delivery to the second consumer.

14. The method for delivering locally sourced goods according to claim 13, wherein the second notification comprises a plurality of second notifications including a first delivery notification indicating that one or more physical items associated with the first online order was delivered to the first consumer, and a second delivery notification indicating that one or more physical items associated with the second online order was picked up for delivery to the second consumer.

* * * * *